(12) United States Patent
Vanderhye

(10) Patent No.: US 7,775,843 B1
(45) Date of Patent: Aug. 17, 2010

(54) WIND TURBINE BOATS, WATERCRAFT DRIVES, AND WIND TURBINE ENHANCEMENTS

(76) Inventor: Robert A. Vanderhye, 801 Ridge Dr., McLean, VA (US) 22101

( * ) Notice: Subject to any disclaimer, the term of this patent is extended or adjusted under 35 U.S.C. 154(b) by 1490 days.

(21) Appl. No.: 10/443,954

(22) Filed: May 23, 2003

Related U.S. Application Data

(60) Provisional application No. 60/386,569, filed on Jun. 7, 2002.

(51) Int. Cl.
    B63H 9/00 (2006.01)
(52) U.S. Cl. .......................................................... 440/8
(58) Field of Classification Search ................... 440/8, 440/75
    See application file for complete search history.

(56) References Cited

U.S. PATENT DOCUMENTS

| | | | | |
|---|---|---|---|---|
| 1,466,026 A | * | 8/1923 | Manning | 416/32 |
| 1,471,870 A | * | 10/1923 | Tust | 440/8 |
| 1,506,847 A | * | 9/1924 | Maki et al. | 440/8 |
| 1,650,702 A | * | 11/1927 | Folmer | 440/8 |
| 1,697,574 A | * | 1/1929 | Savonius | 416/110 |
| 2,677,344 A | * | 5/1954 | Annis | 440/31 |
| 3,212,470 A | * | 10/1965 | Wiggin | 440/8 |
| 3,757,729 A | | 9/1973 | Golden | |
| 3,967,574 A | | 7/1976 | Golden | |
| 4,274,011 A | | 6/1981 | Garfinkle | |
| 4,371,346 A | * | 2/1983 | Vidal | 440/8 |
| 4,406,584 A | | 9/1983 | Stepp | |
| 4,497,631 A | * | 2/1985 | Belanger | 440/8 |

(Continued)

FOREIGN PATENT DOCUMENTS

| GB | 2372783 | 9/2002 |
|---|---|---|
| IT | 1158493 | 2/1987 |

OTHER PUBLICATIONS $21^{st}$ Century Multihulls, AYRS 120-1, Norwood, Chapter 5, "Wind & Water Turbines", pp. 48-64 & Errata.

(Continued)

*Primary Examiner*—S. Joseph Morano

(57) ABSTRACT

A wind powered watercraft, and improved individual components utilizable with the watercraft or elsewhere, does not require the user to have sailing skills, and can go directly into the wind. A vertical axis wind turbine (such as a Savonius or modified Savonius) is mounted to a multihull boat (such as a catamaran). The turbine has a shaft operatively connected to a propulsion system, such as by a clutch. The propulsion system may be a large diameter and pitch horizontal propeller, a vertical axis propeller, or a novel fishtail or sculling oar simulating mechanism, including an oscillating element with a flexible material (e.g. durometer between 40-100) free end. A mechanism which prevents useless spinning of the vertical axis wind turbine when the watercraft is docked may also be provided. For when the wind velocity is insufficient, a manual assist may be provided. The manual assist may have primarily human arm powered and human leg powered drive assemblies, each including a substantially inextensible cord, a cord drum operatively connected by a one-way clutch to the wind turbine shaft, and a take-up. The wind turbine boat may be produced from a conventional sailboat by replacing a sailboat mast with the wind turbine and propulsion system, and converted back to the sailboat when desired.

25 Claims, 23 Drawing Sheets

U.S. PATENT DOCUMENTS

| | | | |
|---|---|---|---|
| 4,522,600 A * | 6/1985 | Jost | 440/8 |
| 4,553,037 A | 11/1985 | Veazey | |
| 4,746,112 A | 5/1988 | Fayal | |
| 4,969,846 A | 11/1990 | Sugimoto | |
| 4,976,451 A | 12/1990 | Kamenov | |
| 5,058,522 A | 10/1991 | Bauer | |
| 5,072,929 A | 12/1991 | Peterson et al. | |
| 5,242,028 A | 9/1993 | Murphy et al. | |
| 6,022,249 A | 2/2000 | Ketterman | |
| 6,293,835 B2 | 9/2001 | Gorlov | |
| 6,428,275 B1 | 8/2002 | Jaakkola | |
| 6,497,593 B1 * | 12/2002 | Willis | 440/8 |

OTHER PUBLICATIONS

"Autogiro Boats"; Dec. 5, 1995; Sinclair; www.users.globalnet.co.uk/-fsinc/yachts/auto/index.htm.

WS-models; admitted prior art; www.windside.com.

"Making a simple Savonius Wind Turbine"; Turner; www.ata.org.au/70byosav.htm. admitted prior art.

"THYS222 Rowingbike"; admitted piior art; www.bcbikes.com/about_row_bikes.html.

"How Things Work"; Segalat; vol. III, Simon + Schuster; pp 206, 207, 213.

"HOBIE 2002 Parts and Accessories Catalog", Cover & p. 16; admitted prior art.

Random House Unabridged Dictionary, $2^{nd}$ Ed., 1993; p. 1724 "scull" definition.

"1800 Mechanical Movements and Devices"; 1911, 2000; Algrove Pub, pp. 39,165,231,243,247,254,259.

AYRS Pub. #91, Power From The Wind; Mar. 1979; pp. 4-13, 30, 31, 46, 47 & 52-54.

AYRS Pub. #101, Windmills And Hyrdofoils; Aug. 1985; pp. 25-28.

AYRS Pub. #102, Sailboards & Speedweels Jan. 1986; pp. 20-24.

AYRS Pub. #112, AYRS Projects; Fe., 1993; pp. 29-32.

Cousteau Ships Alcyone + Calypso II; www.cousteau.org.

"New Rotor Ship Sails In Lightest Wind", Popular Science, Jul. 1933.

* cited by examiner

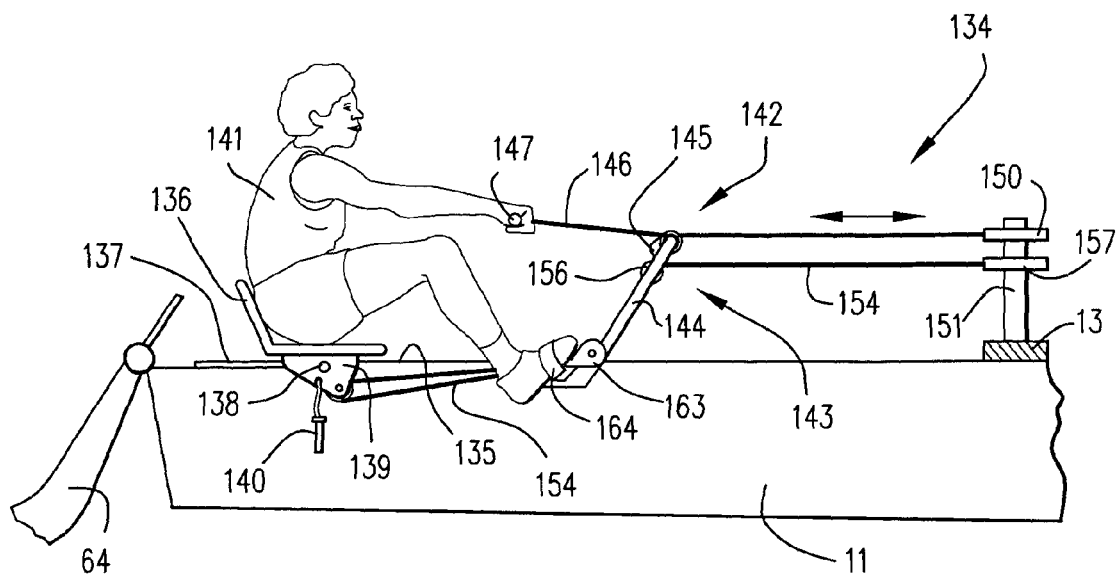
FIGURE 27
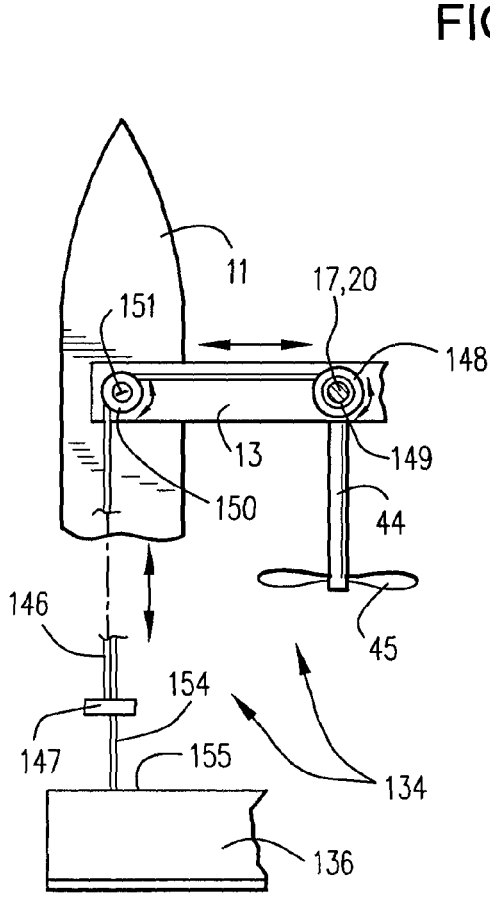
FIGURE 28
FIGURE 29

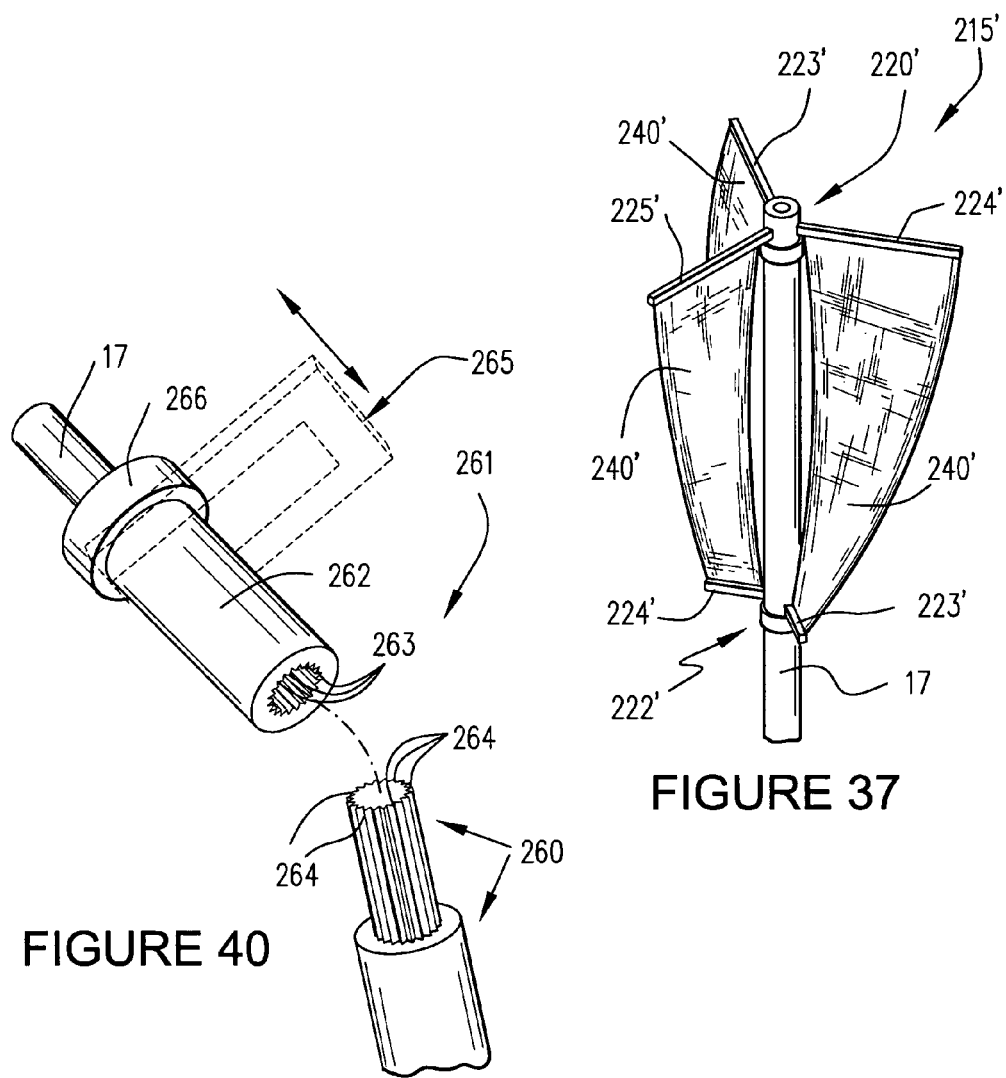
FIGURE 37
FIGURE 40
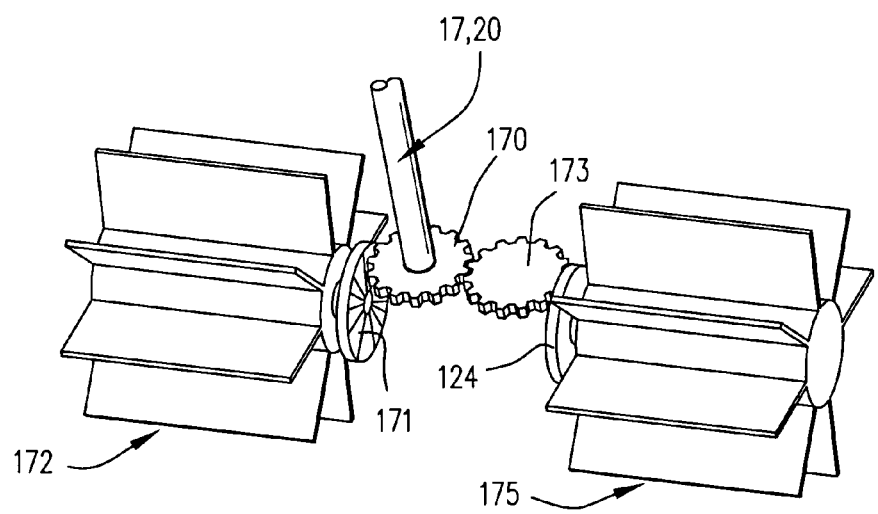
FIGURE 30

WIND TURBINE BOATS, WATERCRAFT DRIVES, AND WIND TURBINE ENHANCEMENTS

CROSS REFERENCE TO RELATED APPLICATIONS

This application claims the priority of U.S. provisional application 60/386,569 filed Jun. 7, 2002.

BACKGROUND AND SUMMARY OF THE INVENTION

There have been proposals for wind turbine and autogiro boats for more than a century. Wind turbine boats typically use a horizontal or vertical axis wind turbine to drive a propeller, which in turn powers the boat, while autogiro boats use thrust forces on rotating vanes directly to power a boat. The promise has always been that one need not know how to sail to operate a wind turbine boat, and can move directly into the wind, and directly downwind faster than the wind speed. While there have been many proposals, instances of practical use of these technologies are few and far between. In fact, the Amateur Yacht Research Society publication AYRS 120-1 (pages 48-64) actually suggests that a horizontal axis wind turbine multihull boat is impractical, and cannot go directly into the wind.

The failure of practical application of wind turbine technology to watercraft may be due to a failure to properly meld existing components into an optimum combination. The failure may also be due to the lack of a suitable drive mechanism, incorrect selection of the wind turbine configuration, the failure to properly deal with safety issues, the lack of an appropriate assist mechanism for when there is insufficient wind either before embarking on or during a journey, what to do with the wind turbine when docked, or a combination of these and other factors. In any event, according to one aspect of the present invention, a wind turbine watercraft is constructed that will be operational and can power directly into the wind, and overcomes all of the difficulties mentioned above. However the invention is not limited to a wind turbine watercraft alone, but rather includes as separate and distinct concepts: a new water propulsion system in general that can be powered by other forces than wind power (e.g. by human power, electric or fossil fuel motors, etc.); a modified Savonius wind turbine per se; a collapsible vertical axis wind turbine in general; a manual assist for a wind turbine; and a power transmitting mechanism suitable for use in a variety of low rpm environments not just on watercraft. The invention also relates to a method of retrofitting already existing common multihull sail boats for wind turbine powering, and the retrofit boat so produced.

According to one aspect of the present invention there is provided a multihull watercraft (e.g. a catamaran or trimaran) having a vertical axis wind turbine and connected propulsion mechanism removably mounted thereto so that the watercraft may be used as a wind turbine powered craft or a sail boat. In one form of the invention, the craft comprises a crossbar extending between two hulls adjacent the front thereof, and a rotating shaft of the wind turbine is removably mounted to the crossbar. The rotating shaft may be removably mounted in a tube connected to the crossbar. The wind turbine may be a sculptured wind turbine, a Savonius [also sometimes popularly referred to as an "S-rotor" wind turbine] or modified Savonius wind turbine, a vertically collapsible wind turbine, or other vertical axis types. The watercraft may include a dolphin striker post and dolphin striker rod, and with the tube also connected to at least one of the dolphin striker post and rod. While the existing fore crossbar of a conventional catamaran may be utilized, an added crossbar may be provided fore of the existing crossbars for mounting the wind turbine.

A method of using the watercraft described above to retrofit it from an existing commercial catamaran sailboat having a fore cross-bar (either existing, or added) to a wind turbine boat, comprises the following: Connecting a vertical axis wind turbine shaft supporting element to the fore crossbar; operatively connecting a shaft of a vertical axis wind turbine into operative engagement with the shaft supporting element. Removably mounting a propulsion system to the catamaran. And operatively connecting the shaft of the wind turbine to the propulsion system. In this way the wind turbine and propulsion system may be removed and a sail mast reconnected to the fore crossbar.

According to another aspect of the present invention, there is provided a watercraft comprising: a vertical axis wind turbine including a shaft; a propulsion mechanism operatively connected to the shaft; and a manual assist operatively connected to the shaft. The watercraft is preferably as described above (i.e. a multi-hull).

The propulsion mechanism may comprise a first gear connected to the shaft for rotation therewith and linear movement therealong, a second gear operatively mounted to a propeller shaft of a substantially horizontal propeller, and a lever operated lifting mechanism which moves the first gear along the shaft between positions engaging, and disengaged from, the second gear. Typically, the lifting mechanism and first gear have cooperating surfaces of low friction material, whereby the lifting mechanism functions only as a clutch, or high friction material, whereby the lifting mechanism functions as a clutch and brake.

The propulsion mechanism may further comprise a third gear operatively connected to the shaft for rotation therewith, and positioned with respect to the first and second gears so that the third gear can be moved into operative engagement with the second gear simultaneously with moving the first gear out of engagement with the second gear, so that the propeller can be rotated to selectively move the watercraft forward or in reverse. The gears may be bevel or miter gears. The propeller shaft may make an angle of between about 10-16 degrees with respect to the horizontal. The horizontal propeller may be mounted so that it is partially in and partially out of the water during normal loading of the watercraft, e.g. the propeller may have a diameter of about ten-fourteen inches and be approximately half in and half out of the water.

Instead of using gears, cams, or other mechanical elements, a flexible drive shaft may be provided between the vertical axis wind turbine and the horizontal propeller. A clutch may be provided in the flexible shaft.

Instead of a horizontal propeller, the propulsion mechanism may comprise an oscillating fishtail or sculling oar simulating mechanism, or a vertical axis propeller, or a paddlewheel assembly.

According to another aspect of the invention, a watercraft propulsion mechanism per se is provided comprising: a drive element operatively connected to a rotatable shaft; and an oscillating element having a relatively rigid first end operatively connected to said drive element, and a flexible material free second end simulating a fishtail or sculling oar. The drive element may comprise a crank arm operatively connected to the oscillating element by a guide element, one of the oscillating element and guide element having a pin and the other a slot receiving the pin. Alternatively, the drive element may comprise a cam operatively connected to the oscillating element by a cam follower. The cam may comprise a lobed cam, and the cam follower engages the cam lobes. Alternatively, the cam may include a cam track, with the cam follower riding in the cam track. In another modification the drive element comprises a crank arm pivoted to a lever, in turn pivoted to a rack reciprocating generally horizontally (e.g. from bow to stern on a boat), and a pinion on a generally vertical shaft cooperating with the rack.

In the fishtail simulating propulsion mechanism, the flexible material may have a durometer of between about 40-100, and at least one supporting rib. Also, a portion of the oscillating element containing the flexible material may make an angle of between about 5-25 degrees with respect to a portion of the oscillating element containing the cam follower. The oscillating element may have a range of oscillation of between about 10-45 degrees. The drive element is preferably connected to a vertical axis wind turbine.

According to yet another aspect of the present invention a drive mechanism is provided comprising: a shaft; a first bevel or miter gear connected to the shaft for rotation therewith and linear movement therealong, a second bevel or miter gear operatively mounted to a driven element; a lever operated moving mechanism which moves the first gear along the shaft between positions engaging, and disengaged from, the second gear; and a third bevel or miter gear operatively connected to the shaft for rotation therewith, and positioned with respect to the first and second gears so that the third gear can be moved into operative engagement with the second gear simultaneously with moving the first gear out of engagement with the second gear, so that the driven element can be rotated to selectively move clockwise or counterclockwise. The gears may be spaced so that the first and third gears are movable to a neutral position in which the second gear is not engaged by either the first or third gears. The driven element may comprise a propeller shaft connected to a substantially horizontal boat propeller, and the propeller shaft may make an angle of between about 10-16 degrees with respect to the horizontal, and/or be positioned so that it is partially in, and partially out of, the water during normal loading of a watercraft with which the propeller is associated. The lever operated moving mechanism may comprise a collared gear tube connected to the first gear, and a generally fork-shaped plate or bar substantially surrounding the gear tube and engaging the collar between the collar and first gear to move the first gear and gear tube. The first gear may be splined to the shaft, and the plate or bar and collar may have cooperating low friction material surfaces. The gear tube undersurface and the plate or bar upper surface may be of low friction material, so that the device functions only as a dutch, or high friction material, so that the device functions as a clutch and brake (significantly slowing, or stopping, rotation of the shaft).

According to another aspect of the present invention there is provided a modified Savonius wind turbine comprising a pair of opposite curved vanes connected together by a perforated central shaft, which allows spillover from one vane to the other to increase efficiency. The vanes may have planar portions, and the central shaft has flat portions to which the vane planar portions are affixed.

According to yet another aspect of the present invention, a manual assist is provided for a watercraft having a vertical axis wind turbine having a substantially vertical drive shaft. The manual assist may comprise one or both of primarily arm and leg powered drive assemblies. For example, the manual assist arm powered drive assembly comprises a handle connected to a first substantially inextensible cord; a first cord drum mounted to the wind turbine shaft by a first one-way clutch; and a first take-up device (such as a torsion spring, recoil mechanism, flexible band, or the like) which takes up the cord on the drum after pulling force on the handle is released. The first cord may be connected through one or more re-directing elements (such as pulleys) from the handle to the first drum, and the handle may be mounted above an aft portion of a hull of a multihull watercraft (e.g. catamaran).

The manual assist may also comprise a leg powered drive assembly, such as a reciprocal seat mounted above the hull aft portion, with a second substantially inextensible cord connected to the seat for reciprocation therewith, and a second drum connected by a second one-way clutch to the wind turbine shaft. A second take-up device is connected to the second drum. Mounted just fore of the seat may be foot plates against which an operator may press his/her feet during reciprocating movement of the operator on the seat. A support arm may extend upwardly from the foot plates, and cooperate with both the first and second cords.

According to still another aspect of the present invention there is provided a method of retrofitting an existing commercial catamaran having a front cross-bar from a sail boat to a wind turbine boat, comprising: connecting a vertical axis wind turbine shaft supporting tube to the front cross-bar, inserting a shaft of a vertical axis wind turbine into the tube, removably mounting a propulsion system to the catamaran, and operatively connecting the shaft of the wind turbine to the propulsion system. The method may further comprise removing the wind turbine and propulsion system, and reconnecting a sail mast to the front crossbar.

According to another aspect of the invention there is provided a method of powering a land based powered mechanism at a dock using a watercraft having a vertical axis wind turbine operatively connected to a propulsion system, comprising: disconnecting the propulsion system from the wind turbine at a dock; connecting the wind turbine to a land based powered mechanism, such as a pump or generator; and reconnecting the propulsion system to the wind turbine to move the watercraft in water.

According to yet another aspect of the present invention there is provided a multihull watercraft comprising: a plurality of hulls; a propulsion mechanism mounted between two of the hulls; a vertical axis wind turbine operatively mounted to at least one hull, the wind turbine having a shaft; and an operative connection between the wind turbine shaft and the propulsion mechanism, the operative connection including a clutch. Preferably the vertical axis wind turbine comprises a Savonius wind turbine.

The watercraft may further comprise a mechanism which prevents useless spinning of the vertical axis wind turbine when the watercraft is docked (such as various vertically collapsible designs of the wind turbine, a shroud placed over the wind turbine, a connection of the wind turbine to a pump or generator at the dock, a linkage construction allowing collapse of the wind turbine in a manner not properly described as "vertically", a readily detachable vane embodiment, a conventional umbrella collapse configuration, etc.).

A bottom-supported construction of vertically collapsible wind turbine comprises a main vane support releasably connected by one or more fasteners (e.g. screws, pins spring-pressed from the shaft, quick release fasteners, etc.) to a vertical wind turbine shaft, with curved spokes extending radially outwardly therefrom. At least two other vane supports, including an upper vane support, are provided vertically spaced along the shaft from the main vane support. The spokes on the main vane support cooperate with spokes on other vane supports to support vanes of collapsible material (e.g. woven polyester cloth, or kite material). The main vane support and upper vane supported are releasably rigidly connected together by one or more vertical supports connected to the vane supports with quick release fasteners. By first collapsing the main vane support (by removing the fastener(s) connecting it to the shaft) access is readily gained to the quick release fasteners, to allow removal thereof to collapse, in turn, all of the upper vane supports.

The linkage construction of the vane collapse system comprises a main vane support reciprocal along the length of a vertical wind turbine shaft and having a plurality of curved spokes extending substantially radially outwardly therefrom. The spokes are pivoted to the main vane support for pivotal movement about a horizontal axis. Upper spokes are pivoted to the shaft also for pivotal movement about a horizontal axis, and a vertical link is pivotally connected to the main vane support and upper spokes at or near the free ends thereof. Upper vane supports move with the main vane support, being connected thereto by vertical supports. Holes in the main vane support receive pins spring-pressed from the shaft to hold the main vane support in operative and collapsed positions. The bottom edges of the vanes are releasably connected to the spokes of the main vane support (and upper vane supports), such as by snap fasteners, hook and loop fasteners (e.g. VELCRO®), eyelets and rotatable tabs, or the like.

The readily detachable vane embodiment simply uses the releasable connection of the vanes described in the preceding paragraph with substantially rigid (not pivoted) spokes. In this embodiment the upper spokes are preferably attached to vane supports instead of the shaft, and the vertical supports between the spokes are optional.

The propulsion mechanism of the watercraft may comprise a horizontal propeller having a diameter of about ten-fourteen inches, and a large pitch. The multihull watercraft may still further comprise a seat mounted on an aft portion of one of the hulls, a device which selectively maintains the seat in a stationary position, or allows reciprocation thereof fore and aft along the hull, a substantially inextensible cord operatively connected to the seat for movement with it, a cord drum mounted by a one-way clutch to the wind turbine shaft, and a take-up mechanism operatively mounted to the cord drum, so that an operator powering movement of the seat fore and aft assists in powering the propulsion mechanism.

The invention, and its various aspects, will be described more fully—but in a non-limiting manner—with respect to the included drawings.

BRIEF DESCRIPTION OF THE DRAWINGS

FIG. 27 is a side schematic view of the operator-interactive components of a preferred manual assist according to the present invention;

FIG. 28 is a top, schematic, partial view of the components of FIG. 27 shown connected to the shaft of the vertical axis wind turbine of a watercraft according to the invention;

FIG. 29 is a schematic side view of the components of the manual assist of FIGS. 27 & 28 associated with the wind turbine shaft;

FIG. 30 is a schematic isometric view of a paddlewheel form of drive mechanism for the watercraft according to the invention;

FIG. 37 is a schematic top perspective view of a modification of the wind turbine of FIG. 31 having spokes of the lower vane support of shorter length;

FIG. 40 is a schematic exploded perspective view of one form an exemplary clutch mechanism utilizable with the flexible drive shaft of FIGS. 38 & 39;

DETAILED DESCRIPTION OF THE DRAWINGS

Figure 1:
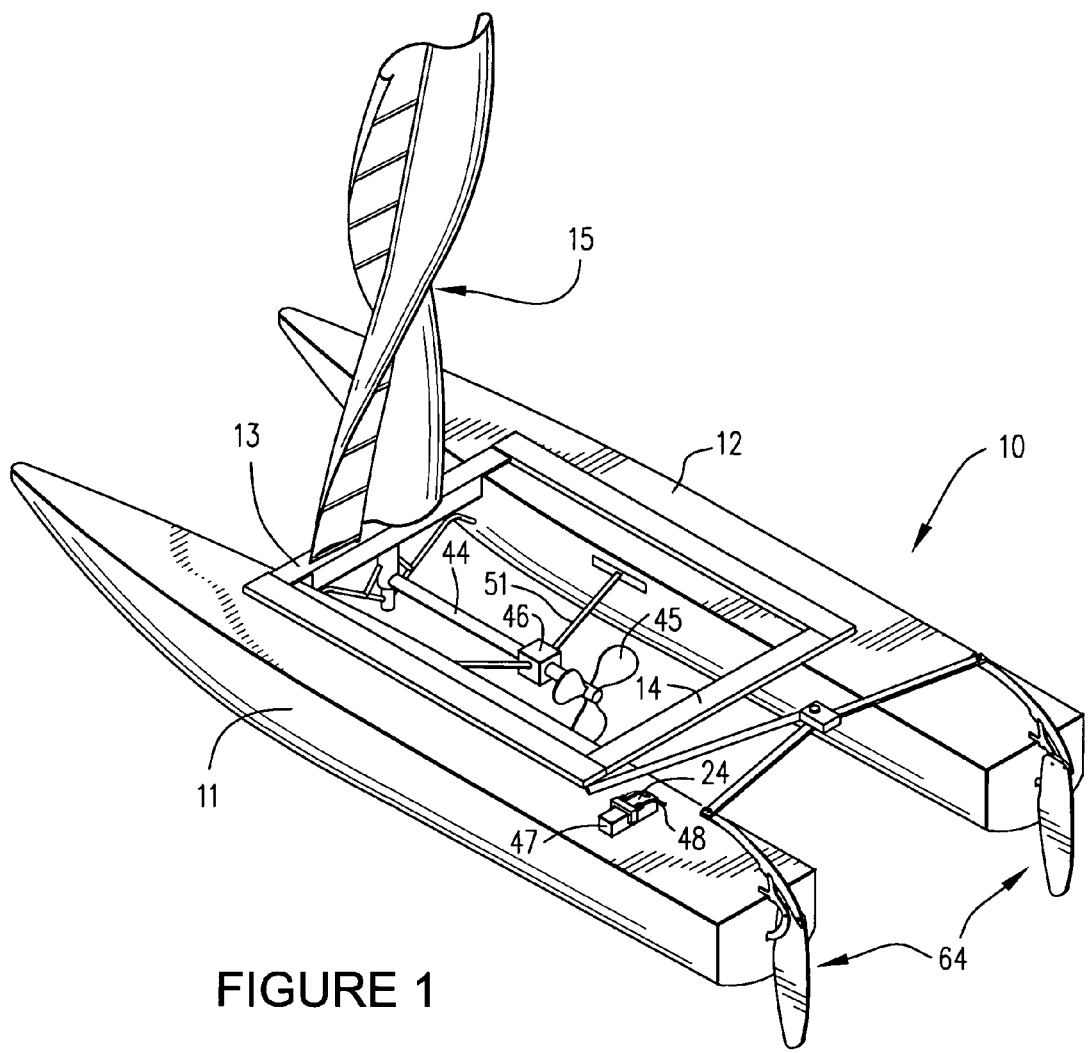
FIG. 1 is a schematic perspective view of an exemplary vertical axis wind turbine multi-hull watercraft according to the present invention.

In the drawings, the following reference numerals have the following general descriptions:

| | |
|---|---|
| 10 | Watercraft |
| 11, 12 | Hulls |
| 13, 14 | Crossbars |
| 15 | Wind turbine |
| 16 | Support tube |
| 17 | Wind turbine shaft |
| 18 | Bearing(s) |
| 19 | Bracket(s) |
| 20 | Shaft extension |
| 21 | Splines |
| 22 | Drive gear |
| 23 | Clutch assembly |
| 24 | Handle support surface |
| 25 | Gear tube |
| 26 | Internal splines |
| 27 | Gear tube collar |
| 28 | Collar undersurface |
| 29 | Gear surface |
| 30 | Driven gear |
| 31 | Clutch plate or bar |
| 32 | Top surface of 31 |
| 33 | Pivot pin |
| 34 | Support plate |
| 35 | Operating lever |
| 36 | Front end of 35 |
| 37 | Width of cutout in 31 |
| 38 | Stop |
| 39 | Spring |
| 40 | Bearing or mount |
| 41 | Propeller drive assembly |
| 42 | Shaft |
| 43 | Universal Join |
| 44 | Propeller shaft |
| 45 | Horizontal propeller |
| 46 | Bearing or mount for 44 |
| 47 | Handle portion of lever 35 |
| 48 | Strap |
| 49 | Leaf Spring |
| 50 | Brackets |
| 51 | Struts of 50 |
| 52 | U-shaped portion of 50 |
| 53 | Leaf Spring |
| 54 | Hydrodynamic cover |
| 55 | Struts for 54 |
| 57 | Reverse gear |
| 59 | Detent |
| 60 | Coil spring |
| 62 | Vertical Propeller |
| 63 | Gearing |
| 64 | Rudders |

-continued

| | |
|---|---|
| 65 | Core of 86 |
| 66 | Covering of 65/86 |
| 67 | Supporting ribs for 66 |
| 68 | Dolphin striker post |
| 69 | Dolphin striker rod |
| 70 | Propulsion system |
| 71 | Drive element (crank arm) |
| 72 | Guide element |
| 73 | Oscillating element |
| 74 | Non-round hole in 71 |
| 75 | Hole in 71 |
| 76 | Pivot pin |
| 77 | Hole in 73 |
| 78 | Front end of 73 |
| 79 | Elongated slot |
| 80 | Bracket |
| 81 | Pivot pin |
| 82 | Middle opening in 73 |
| 83 | Spring |
| 84, 85 | Caps |
| 86 | Free end of 73 |
| 90 | Cam |
| 91 | Cam lobes |
| 92 | Cam follower |
| 93 | Lever |
| 94 | Pivot |
| 95 | Portion of 93 |
| 97 | End of lever 101 |
| 98 | Cam |
| 99 | Cam track |
| 100 | Cam follower |
| 101 | Oscillating lever |
| 102 | Pivot pin |
| 103 | Free end of 101 |
| 104 | Disconnect (clutch) |
| 105 | Manual assist |
| 106 | Ratchet wheel |
| 107 | Drive pawl |
| 108 | Lever |
| 109 | Catch pawl |
| 110 | Support structure |
| 111 | Coupler |
| 112 | Crank arm |
| 113 | Pivot |
| 114 | Knob/handle |
| 116 | Pivot pin |
| 117 | Elastic band loop |
| 120 | Savonius wind turbine |
| 121 | Savonius wind turbine |
| 122 | Vanes of 120 |
| 123 | Vanes of 121 |
| 125 | Perforated shaft of 120 |
| 126 | Perforated shaft of 121 |
| 127 | Perforations of shaft 125 |
| 128 | Vane 122 end terminations |
| 129 | Vane 123 end terminations |
| 130 | Passage-defining elements |
| 131 | Planar end of 123 |
| 132 | Shaft 126 flat sides |
| 133 | Perforations of shaft 126 |
| 134 | Preferred manual assist |
| 135 | Seat mounting rail(s) |
| 136 | Reciprocal seat |
| 137 | Hole in rail |
| 138 | Hole in seat flange |
| 139 | Seat flange |
| 140 | Locking pin for holes 137,8 |
| 141 | Manual assist operator |
| 142 | First [arm] drive assembly |
| 143 | Second [leg] drive assembly |
| 144 | Support arm |
| 145 | Pulley |
| 146 | First cord |
| 147 | Handle |
| 148 | First cord drum |
| 149 | First drum take-up |
| 150 | Pulley |
| 151 | Pulley mounting shaft |
| 152 | First one-way clutch |

-continued

| | |
|---|---|
| 154 | Second cord |
| 155 | Front of seat 136 |
| 156 | Pulley |
| 157 | Pulley |
| 158 | Second cord drum |
| 159 | Second drum take-up |
| 162 | Second one-way clutch |
| 163 | Foot plates |
| 164 | Foot plate straps |
| 170 | Drive gear |
| 171 | Face gear |
| 172 | First paddlewheel |
| 173 | Reversing gear |
| 174 | Face gear |
| 175 | Second paddlewheel |
| 215 | Vertically collapsible wind turbine |
| 215' | Modified vertically collapsible wind turbine (other primed reference numerals are the FIG. 37 modified forms of the original reference numeral structures); 215 A, 215 B, other modifications of collapsible wind turbines |
| 220-222 | Vane supports |
| 223-226 | Spokes |
| 227 | Vane support hub |
| 228 | Central vertical bore |
| 229 | Pin-receiving horizontal bore |
| 231, 232 | Locking pins |
| 233 | Holes in shaft 17 for pins |
| 234 | Pin projections |
| 235 | Pin actuator rod |
| 236 | Pin shaft |
| 238 | Pin screw threads |
| 239 | Pin head |
| 240 | Vane |
| 242, 243 | Battens |
| 245 | Vane material top end |
| 246 | Vane material bottom end |
| 247 | Stitching |
| 248 | Fastener (staple) |
| 249 | Pocket material |
| 250 | Stitching |
| 252 | Elongated projections (keys) |
| 253 | Shaft grooves |
| 260 | Flexible shaft |
| 261 | Clutch |
| 262 | Clutch tube |
| 263 | Clutch serrations |
| 264 | Clutch grooves |
| 265 | Clutch actuator |
| 266 | Clutch collar |
| 270 | Bend in shaft 260 |
| 271 | Bearing elements |
| 272 | Cross pieces |
| 273 | Bearing |
| 274 | Cross piece |
| 276 | Main vane support |
| 277 | Removable fastener |
| 278 | Opening in 276 |
| 279 | Opening in shaft 17 |
| 280 | Spoke |
| 281-281C | Vanes |
| 282 | Bottom vane support |
| 283 | Third from bottom vane support |
| 284 | Vane support |
| 286-288 | Vertical supports |
| 290 | Quick release fasteners |
| 292-294 | Openings for 290s |
| 296 | Main vane support |
| 297 | Openings in 296 |
| 298 | Spring pressed pins for operative position |
| 299 | Spring pressed pins for inoperative position |
| 300 | Spokes |
| 301 | Pivot pins |
| 302 | Pivot movement stop |
| 303 | Vanes |
| 304 | Tabs |
| 305 | Bottom edge of vane |
| 306 | Male snap fasteners |
| 307 | Female snap fasteners |
| 309 | Upper spokes |

-continued

| | |
|---|---|
| 310 | Vertical links |
| 311-313 | Pivot pins |
| 315 | Upper vane |
| 316 | Upper vane support |
| 317 | Vertical supports |
| 319 | Hook fastener strip |
| 320 | Loop fastener strip |
| 321 | Hook fastener strip |
| 322 | Loop fastener strip |
| 323 | Vane side edge |

FIG. 1 schematically illustrates a perspective view of one exemplary (only) embodiment of a wind turbine watercraft according to the invention. The watercraft, generally illustrated at 10, preferably comprises a multihull (a catamaran is shown, but trimarans, or other multihulls, may be used), e.g. having at least first and second hulls 11, 12. Any suitable multihull may be utilized, however according to one aspect of the invention, a Hobiecat® (e.g. a sixteen-eighteen foot Hobie)—one of the most common and practical catamarans in the world—is retrofit with a wind turbine in place of the mast and sail.

The catamaran illustrated in FIG. 1 includes fore and aft crossbars 13, 14, and a vertical axis wind turbine 15 mounted on or adjacent the fore crossbar 13, near where a conventional main sail would be. The wind turbine may be any suitable type, lift, drag, or other. The turbine 15 actually schematically illustrated in FIG. 1 is one commercially available from Oy Windside Production Ltd. of Finland and is viewable at www.windside.com (e.g. a WS-2B model), and is referred to hereafter as a "sculptured" wind turbine. However, for cost or other reasons other vertical axis wind turbines may alternatively (or additionally) be used, including (without limitation) Savonius (either conventional or the novel modified Savonius configurations according to the invention), Giromills, feathering or curved vane (as seen in mechanisms 615 and 614 of "1800 Mechanical Movements And Devices", © 1911, 2000, Algrove Publishing Limited), closed helical (as seen in U.S. Pat. No. 6,293,835), reefable rotorsail (as seen in U.S. Pat. No. 4,274,011) or Darrieus vertical axis wind turbines.

If the watercraft 10 comprises a trimaran, two wind turbines 15 may be utilized, one between each of the side hulls and the center hull. Alternatively, extra wind turbines can be mounted outside each of the hulls of a catamaran, or outside the side hulls of a trimaran. Other numbers of wind turbines 15 may be utilized for other multihull configurations.

Figure 2:
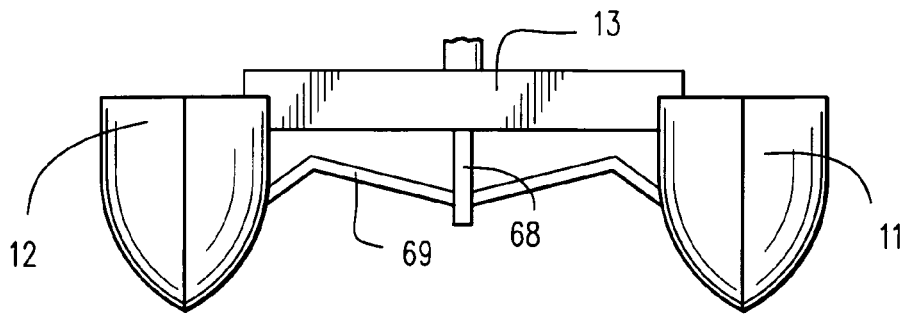
FIG. 2 is a front schematic view of a conventional sixteen foot Hobiecat® catamaran.
Figure 3:
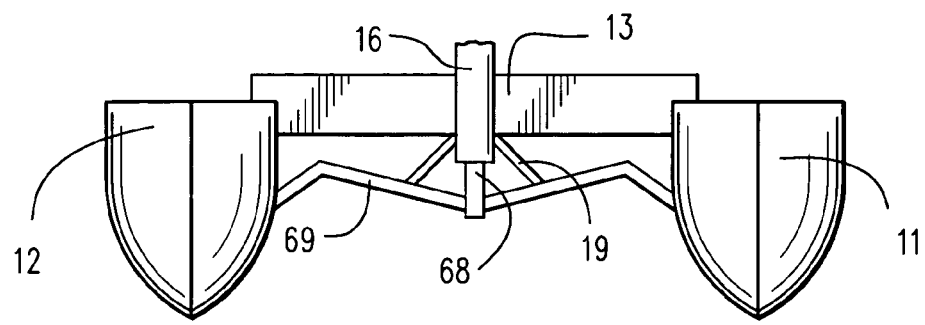
FIG. 3 is a view like that of FIG. 2 only showing wind turbine mounting structure modifications according to the invention.

FIG. 2 is a front view of a conventional sixteen-foot Hobiecat®, including a sail mount on the fore cross bar 13, a dolphin striker post 68, and a dolphin striker rod 69. As shown in FIG. 3, a front view of a Hobiecat modified to receive a vertical axis wind turbine as according to the invention, an aluminum, hard plastic, or other rigid relatively corrosion-resistant material, tube 16 is welded or otherwise affixed to the fore cross bar 13 and the dolphin striker post 68 and/or dolphin striker rod 69. A shaft 17 driven by the turbine 15 is removably received within the tube 16, and at least one bearing 18 is provided for mounting the shaft 17 for rotation about a generally vertical axis. The at least one bearing 18 preferably is a self-aligning bearing having a minimum (shaft) inside diameter of about one inch, with a moisture-proof seal, and capable of taking the dead weight (axial thrust and side loads) of the wind turbine 15. Some possibilities include a Fafnir Type RCJ P1, and a Seal Master MSFT-16C or LFT-16C.

Figure 5:
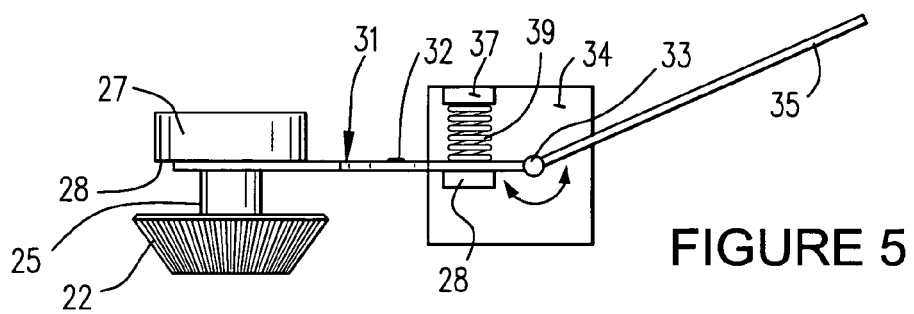
FIG. 5 is a side schematic detail view of the exemplary gear and clutch mechanism of FIG. 4.
Figure 6:
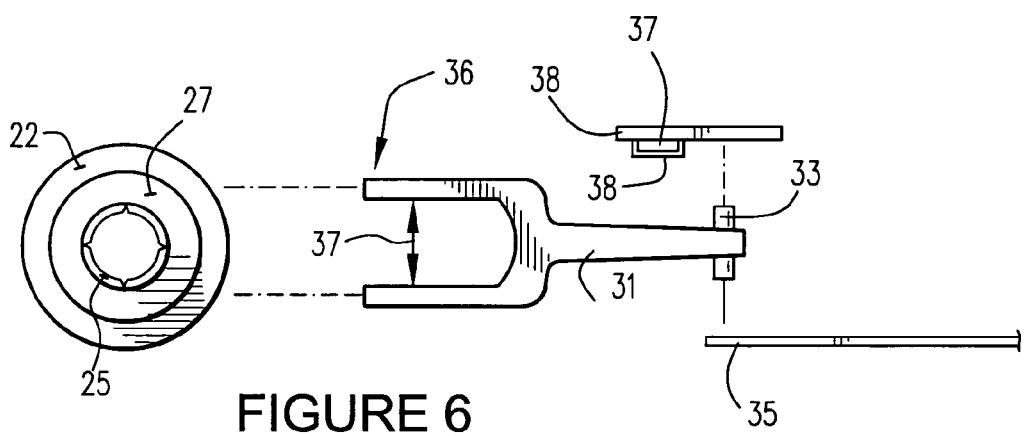
FIG. 6 is a top exploded view of the mechanism of FIG. 5.
Figure 7:
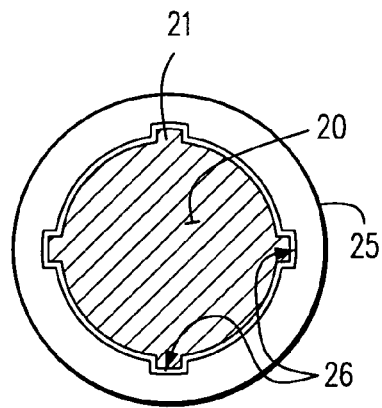
FIG. 7 is a view partly in cross-section and partly in elevation showing the cooperation between the gear tube and shaft extension of FIG. 4.
Figure 4:
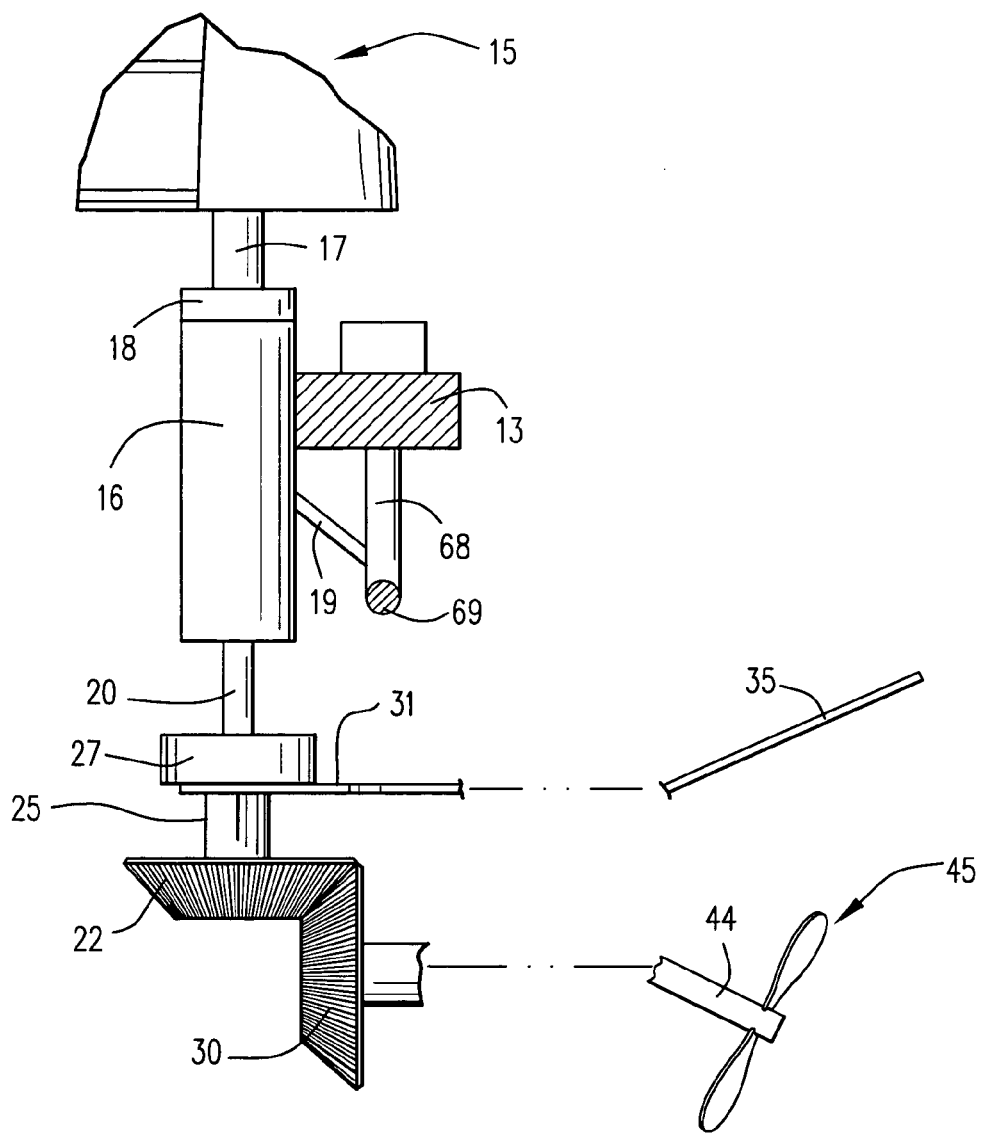
FIG. 4 is a schematic side assembly view of the mounting structure of FIG. 3 in association with a wind turbine and horizontal propeller drive system according to the invention.
Figure 8:
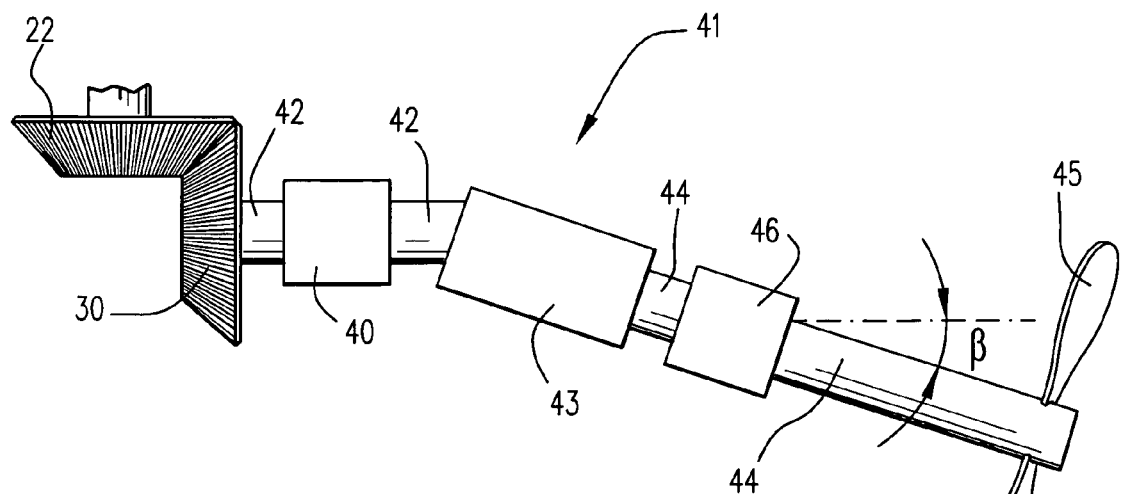
FIG. 8 is a schematic side view of an exemplary horizontal propeller drive gear assembly and propeller for driving an exemplary watercraft according to the invention.

FIG. 4 is a schematic assembly drawing of the preferably releasable/removable mounting of the tube 16 support structure for the vertical axis wind turbine shaft 17, gearing, and propeller, while FIGS. 5-7 show details of an exemplary lower gearing assembly and "clutch" mechanism for driving a conventional boat propeller; and details of an exemplary propeller drive gear assembly and propeller are illustrated in FIG. 8. However other drive mechanisms, as illustrated in other drawings and discussed below, such as vertical axis propellers, paddle wheels, and flapping or oscillating drives, may be utilized.

The brackets 19 and/or other structures for mounting the tube 16 are not critical, and may be of any conventional construction that performs the function of properly mounting the tube 16. The bearing 18 must be suitable for supporting the shaft 17 for low friction rotary movement, and be durable and water proof. Alternatively, the tube 16 may itself be the bearing (if it has a low friction coating or material on the interior, such as PTFE), but desirably the tube 16 is merely a mounting structure. The shaft 20 extending downwardly from the tube 16 may be integral with (e.g. a continuation of) the mounting shaft 17 for the wind turbine 15 or simply attached thereto (by any conventional mechanism) for rotation therewith.

The tube 16 and brackets 19 are mounted in such a way that they do not adversely affect the normal insertion of a conventional mast in the existing mast support on the Hobiecat. Therefore, after removal of the wind turbine 15 and associated driven structures (and the tube 16 and brackets 19 if necessary), the catamaran 10 may be used as conventionally for sailing.

The shaft 20 has external splines 21 [see FIG. 7, a detail cross-sectional view of the shaft] in the preferred embodiment illustrated where the "clutch" is a simple lift plate for the gear 22 driven by the shaft 20.

The reciprocal gear and clutch assembly 23 [see FIGS. 4-7] includes the gear tube 25, which is preferably integral with the gear 22, and rotates the gear 22. The external diameter (including splines 21) of the shaft 20 is less than the internal diameter of the gear tube 25. In the embodiment illustrated, the gear tube 25 has an internal spline configuration 26 [FIG. 7], to cooperate with the splines 21 on the shaft 20 so that rotation of the shaft 20 effects rotation of the tube 25 and gear 22, yet the tube 25 is vertically reciprocal with respect to the shaft 20. The tube 25 has a gear tube collar 27 of significantly larger diameter than the tube 25 itself, and the under-surface 28 [see the exploded view of FIG. 5] thereof is preferably of a low friction material, or coated with such a material, such as PTFE, so that if the surface 28 engages the surface 29 [FIGS. 5-6] rotation of the gear 22 will not be significantly retarded. The gear 22 may be a spur gear, or a conical gear, or a worm gear, but preferably is a bevel or miter gear as illustrated. The gear 22 may be made of aluminum, nylon (or other hard plastic) or other lightweight and/or corrosion resistant material. The gear 22 is a drive gear and must mesh properly with the driven gear 30 [FIGS. 4 & 8] connected to the propeller 45 to drive the driven gear 30. The driven gear 30 may be of any configuration which meshes properly with the gear 22 (e.g. 30 is a bevel or miter gear when gear 22 is a bevel or miter gear).

The "clutch" mechanism of the assembly 23 includes the clutch plate or bar 31 [FIGS. 5-6] having low friction top surface 32, the pivot pin 33, the support plate 34, and the operating lever 35. The forked front end 36 of the clutch plate or bar 31 has a cutout portion with a width 37 that is greater than the outside diameter of the gear tube 25, but less than the diameter of the collar 27. When the pivot pin 33 is pivoted by the lever 35, the clutch plate or bar 31 moves upwardly so that the surfaces 32, 28 engage, and the collar 27 and attached tube 25 and gear 22 are lifted out of contact with the gear 30 [which is not vertically movable]. The lever 35 is preferably operated by a handle portion 47 thereof located [see FIG. 1] where the rudders 64 of the catamaran are operated. At the operation location there is a surface 24 that the handle portion 47 rests on. A strap 48 or functionally similar mechanism can be provided to "latch" the handle portion 47 of the lever 35 in a position where the element 31 front end 36 has been elevated (and thus the gears 22/30 disengaged).

That is, according to this aspect of the invention there is provided a drive wherein a lever operated moving mechanism comprises a collared gear tube 25 connected to a first gear 22, and a generally fork-shaped plate or bar 31 substantially surrounding the gear tube 25 and engaging the collar 27 between the collar and first gear to move the first gear and gear tube along the splined shaft 20.

If desired, a stop 38 is provided on the mounting plate 34 to stop downward movement of the plate/bar 31 so that it cannot engage the gear 22. Also, a spring bias may be provided to bias the element 31 into contact with stop 38. For instance in the exemplary embodiment shown, the coil spring 39 acts between the shelf 37 of the plate 34 and the plate/bar 31 to bias the element 31 into contact with the stop 38. The mounting plate 34 can be mounted to the pontoons of the catamaran by a bracket, which bracket may also mount the bearing/shaft mount 40 [see FIG. 8].

Instead of the top surface 32 of clutch plate 31 being of low friction material, it can be of high friction material, such as used in commercial brakes, so that it functions as at least a partial brake. The collar 27 undersurface 28 also may be made of high friction material. In this way, the rotation of the shaft 20 to which the gear tube collar 27 is keyed is slowed. This may make re-engagement of the gears 22, 30 associated with the clutch easier. With this construction, the clutch assembly 23 acts as both a clutch and a brake (at least a partial brake).

As yet another alternative, instead of a clutch, a brake per se is provided. The brake may be of any conventional friction brake construction for stopping rotation of the shaft 17/20, e.g. by clamping a predetermined (e.g. roughened) portion of the outer surface of the shaft 17/20 with a conventional high friction material attached to a mechanical or fluid (e.g. hydraulic or pneumatic) actuator.

The assembly 41 is the propeller drive assembly, and includes a gear 30 integral with the shaft 42 [FIG. 8], which passes through a mount or bearing 40. A "universal" joint connection (such as a conventional simple U-shaped element surrounding the end of shaft 42 and connected by a pivot pin thereto) 43 may be provided to connect the driven gear shaft 42 to the propeller shaft 44. Shaft 44 is integral with or rigidly attached to the propeller 45. A mount or bearing 46 is also provided for the shaft 44. Brackets (see FIG. 9 for one example) also mount the element 46 to the hulls of the catamaran, perhaps even by the same bracket that mounts elements 34 and/or 40. The propeller 45 is preferably aluminum, and has a large pitch (i.e. greater than nine inches) so that even when the shaft 44 is rotated at slow speed (the Savonius wind turbine is a slow rotational speed/high torque driver), the catamaran will be propelled forward at a suitable speed.

The literature suggests a desirable shaft 44 angle $\beta$ to the surface of the water [see FIGS. 4 & 8] of about 10-16 degrees (about 10 degrees is likely optimum). This shaft angle $\beta$ may be obtained by any other conventional means aside from what is illustrated in the drawings. For example, cooperating concave face drums on oblique shafts may be utilized, such as illustrated at movement 112 of "1800 Mechanical Movements And Devices", ©1911, 2000, Algrove Publishing Limited.

The horizontal propeller 45 is of conventional boat design, but preferably has a pitch as large as practical since boat speed is directly related to pitch. For example where the shaft 44 has a diameter of about one inch, the propeller 45 may have a diameter of about ten-fourteen inches (e.g. about 11 or 12 inches), and a pitch of about sixteen inches. The gears 22/30, may have any gear ratio desired for optimum operation given the type and size of the wind turbine 15 utilized. For example, the gear ratio of the gears 22/30 may be between about 4:1 to about 1:1 (e.g. about 2:1 or 3:1). A gear ratio of 1:1 may be particularly desirable.

Figure 9:
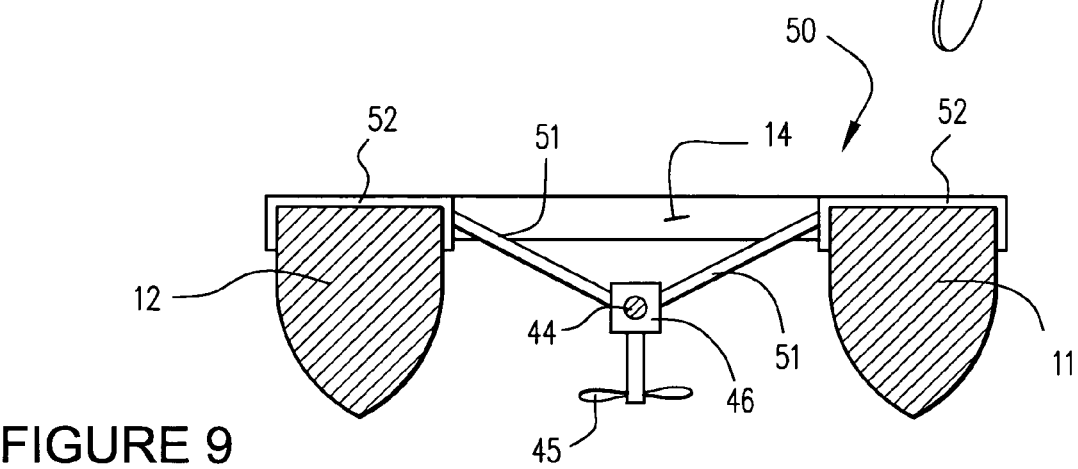
FIG. 9 is a schematic front cross-sectional view, taken along shaft 44, of the watercraft of FIG. 1 showing one exemplary form of drive shaft and horizontal propeller mounting structures according to the invention.

FIG. 9 is a front cross-sectional (taken along shaft 44) schematic view, of one form exemplary brackets 50 could take for supporting one or more mounts or bearings 46 for guiding shaft 44 rotation. A similar arrangement may be provided for supporting the bearing or mount 40. Each bracket 50 has one or more struts 51 affixed (e.g. removably, as by bolts or screws) to the outside of a bearing or mount 46, and a generally U-shaped portion 52 that fits over one of the hulls 11, 12 of the catamaran 10. The portions 52 of the brackets 50 may be held in place by friction with a hull 11, 12, a conventional removable fastener, cooperating hook and loop (e.g. VELCRO®) fasteners, or any other suitable conventional mechanism. Preferably the portions 52 are readily removable from the hulls 11, 12 to allow (after detachment of the wind turbine 15 and shaft 20 and associated gear 22) the catamaran 10 to be used for sailing.

Also, the brackets 50 and related supports are removable so that the entire gear 30, shaft 44, and propeller 45 assembly 41 may be removed from the watercraft 10 when docked. At the dock, an electric generator, pump, or other device commonly driven by a wind turbine, may be operatively connected to the gear 22 instead of just moving the gear 22 out of engagement with the gear 33 using the clutch of the assembly 23. If desired, the wind turbine 15 can instead be covered with a cloth or housing when docked so that it does not rotate, or wind turbine 15 can simply be removed from the watercraft 10 and placed on the ground or in a shed.

Figure 10:
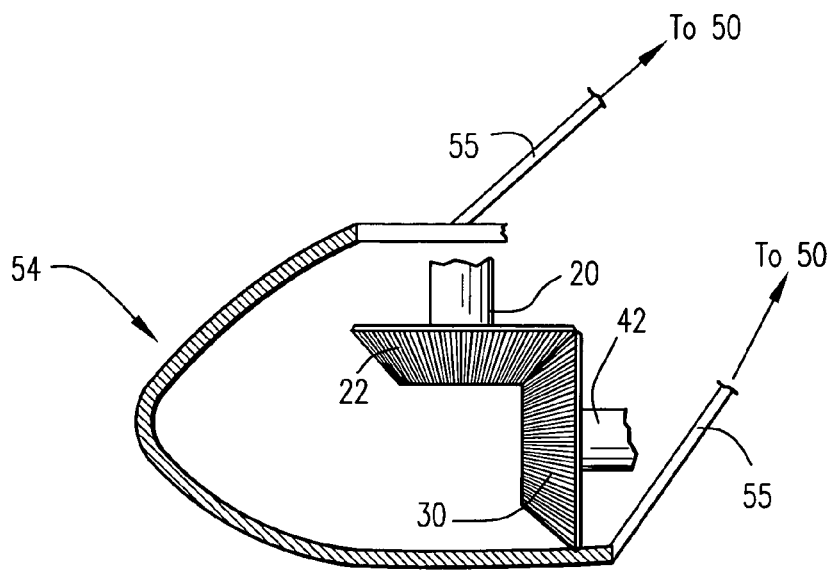
FIG. 10 is a side view, partly in cross-section and partly in elevation, of the intermeshing gears of FIGS. 4 & 8 with a front hydrodynamic cover.

As seen in FIG. 10, a front hydrodynamic cover 54 may be provided for the gears 22, 30 so as to minimize resistance as the watercraft 10 moves through the water. The cover 54 may be connected by struts (not shown) to the same brackets as support the mount or bearing 40, or one or more tapered front edge struts 55 may connect the cover 54 to the gear tube 25.

As many of the components possible as possible are preferably made of aluminum or a suitable plastic (e.g. nylon), so as to minimize weight and degradation thereof in a water environment. The gears 22, 30 should be made of a material that is self-lubricating, or lubricated by water, or at least so that the gears can function in a water environment with minimal difficulties.

In use, the wind turbine 15 drives the shaft 17 supported for rotational movement by the bearing 18 and/or tube 25, which in turn drives the splined shaft 20 and the gear 22. The gear 22 drives the gear 30 and shaft 44, which in turn rotates the propeller 45, driving the catamaran. To stop the driving action, the lever 35 is simply pivoted downwardly, rotating the plate or bar 31 about pivot pin 33 and lifting the gear 22 out of engagement with the gear 30. By slowly lowering the lever 35, the gears 22, 30 may be re-meshed (although it may be necessary to stop or slow the wind turbine before doing that). The catamaran may be steered merely by the already existing rudders 64, and there is no need to "sail" the craft because the direction of the wind is irrelevant. Except for the effect of the force component of the wind on the actual "body" of the craft 10, it moves into the wind at the same speed as with the wind, or perpendicular to it.

Figure 11:
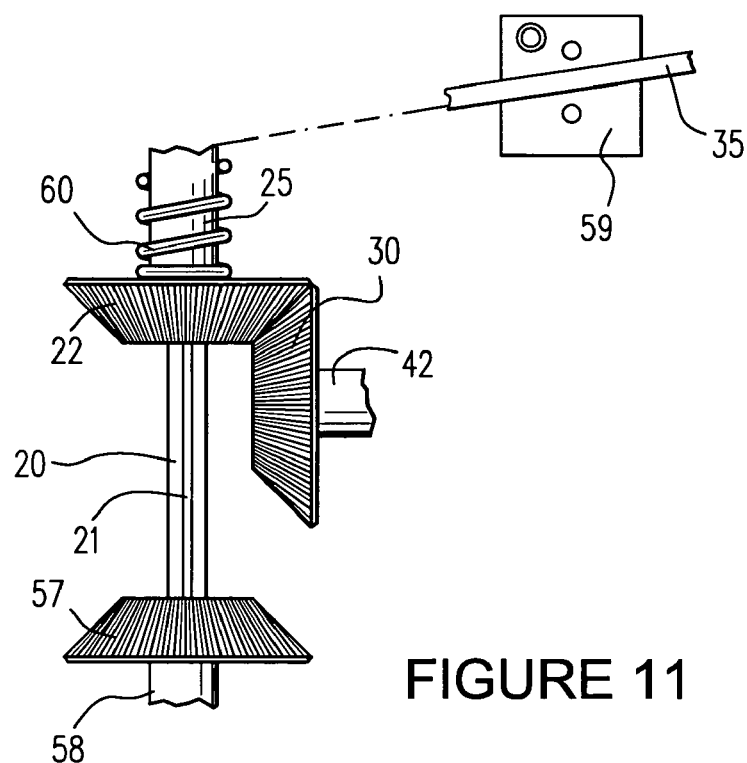
FIG. 11 is a view like that of FIG. 4 but showing a modified gear assembly according to the invention.

If it is desirable to provide a reverse gear for the watercraft 10, the assembly illustrated in FIG. 11 may be utilized. In this embodiment the shaft 20 continues past the gear 22 and is splined to the gear 57. Also, a nut, or other type of cap, 58 is provided on the bottom end of the shaft 20 below the gear 57 so that the gear 57 is lifted when the collar 27 is lifted by lever 35. Where the gears 22, 30 are bevel or miter gears, so is the gear 57. The gear ratios for the gears 30, 57 may be different than for the gears 22, 30 since the reverse speed need not be the same as the forward speed. For example (again depending up the particular wind turbine 15 and other factors) the gear ratio of the gears 30/57 may be about 1:1.

Any suitable conventional detent mechanism (shown only schematically at 59 in FIG. 11) may be provided to detent the lever 35 in different positions. For example the normal or "forward" position would be where the gear 22 is biased by gravity (with an optional spring assist—such as the coil spring 60 illustrated schematically in FIG. 11) into contact with the gear 30, a "neutral" position in which neither of the gears 22, 37 operatively engages the gear 30, and a "reverse" position in which the gear 57 operatively engages the gear 30. All of the gears 22, 30, 57 may be constructed so that they easily mesh together when brought into engagement, even when the shaft 20 is rotating.

The gearing arrangement in FIG. 11 may be replaced by equivalent gearing arrangements, such as movement 977 of "1800 Mechanical Movements And Devices", ©1911, 2000, Algrove Publishing Limited. Also, the gearing arrangements of FIGS. 4 and 11 are not limited to water turbine watercraft, but have numerous other applications.

Figure 12:
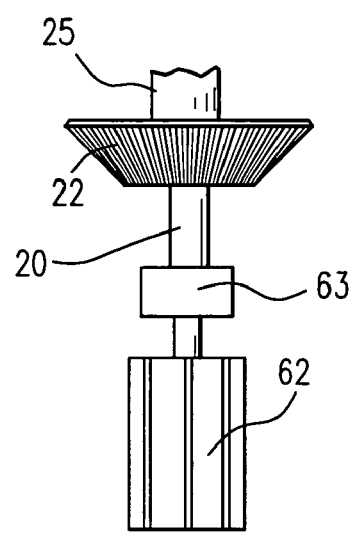
FIG. 12 is a side schematic view of the gear tube and shaft extension of FIG. 4 only in association with a vertical axis propeller.

Instead of a generally horizontal propeller 45, a vertical propeller (shown schematically at 62 in FIG. 12) may be utilized, connected to the shaft 20 either directly, or through gearing (shown in dotted line at 63 in FIG. 12) if the propeller is to be driven at a different speed than the shaft 20 rotates. Non-limiting examples of vertical propellers are the commercial Voith-Schneider propeller (examples of which are shown in U.S. Pat. Nos. 5,588,798 and 4,225,286), and the propellers shown in U.S. Pat. Nos. 5,462,406, or 6,244,919, all of which are incorporated by reference herein.

Other types of propulsion mechanisms aside from propellers may alternatively or additionally be utilized. For example, the foot pedals in U.S. Pat. No. 5,022,249 (incorporated by reference herein) may be replaced by crank arms connected through gearing to the shaft 20, to provide a "penguin-like" propulsion action. Or the novel per se propulsion mechanism according to the present invention as illustrated in FIGS. 13-20 may be used.

Figure 13:
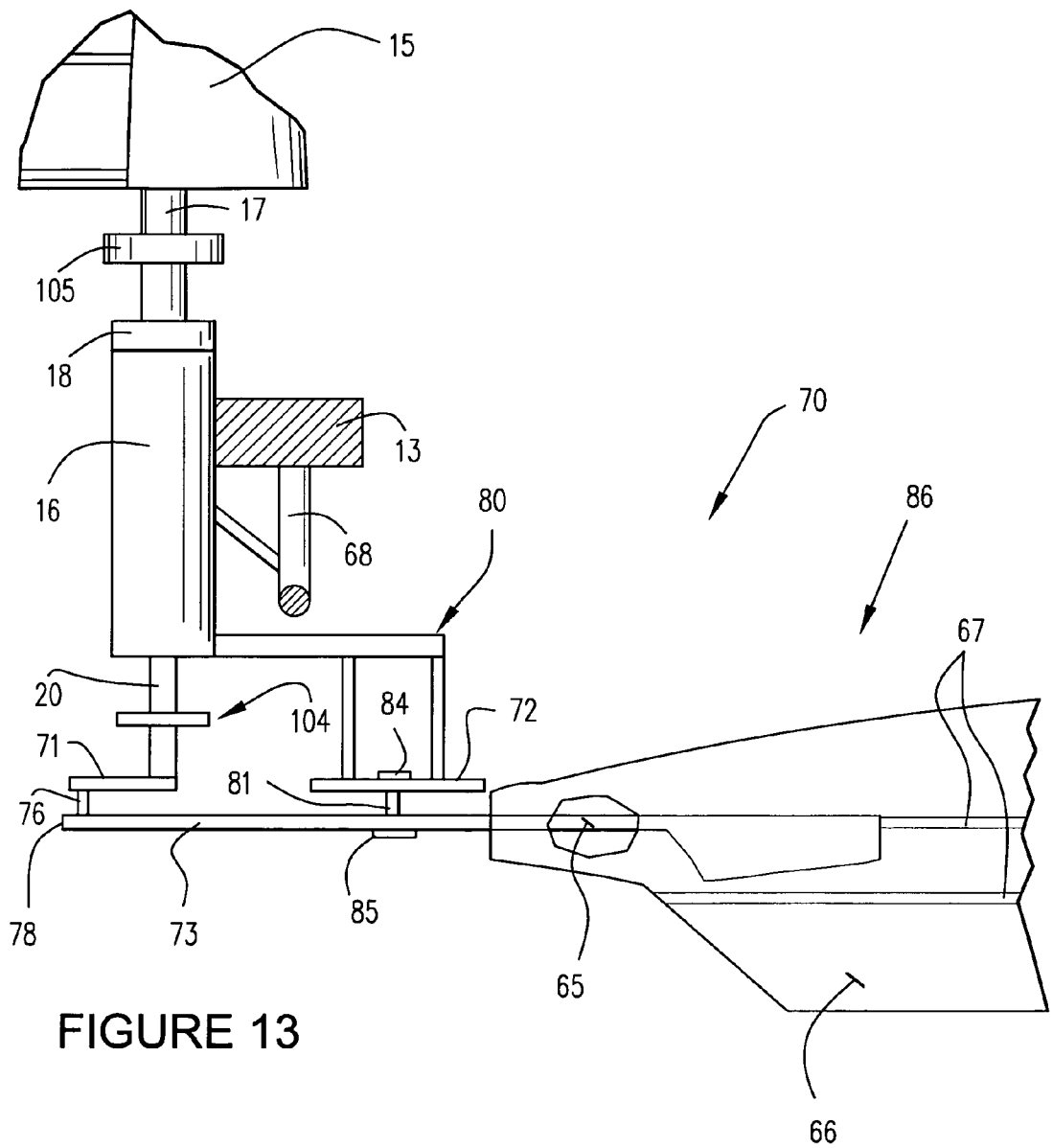
FIG. 13 is a view like that of FIG. 4 only showing an exemplary fishtail propulsion system according to the invention instead of a horizontal propeller.

FIG. 13 is a side schematic view of an exemplary propulsion system 70 according to this aspect of the invention shown hooked up to the wind turbine 15 of FIG. 1. However, it is to be understood that the propulsion system 70 of FIGS. 13-20 (in its various forms) may be used for human powered (hand or leg or both), electric motor-powered, or fossil fuel powered watercraft of any type.

Figure 20:
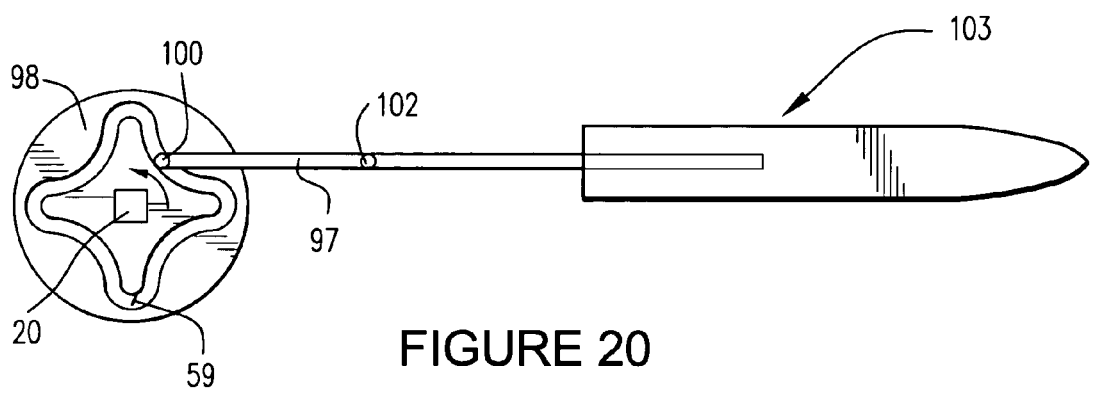
FIGS. 18-20 are top plan view of alternative constructions of the fishtail propulsion system of FIGS. 13-17.
Figure 14:
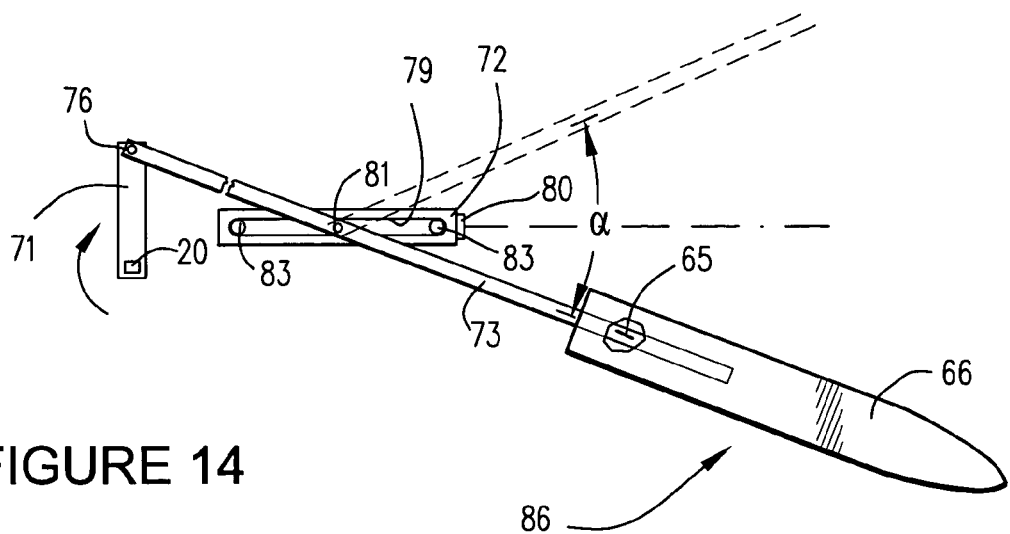
FIG. 14 is a bottom view of the propulsion system of FIG. 13.
Figure 15:
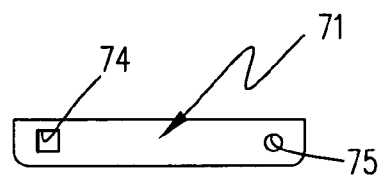
FIGS. 15-17 are top plan views of individual components of the propulsion system of FIGS. 13 & 14.
Figure 16:
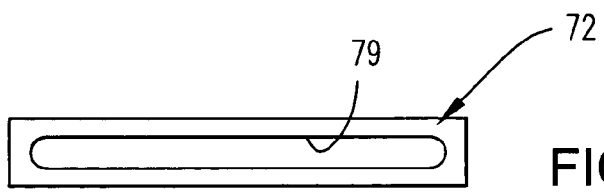
Figure 17:
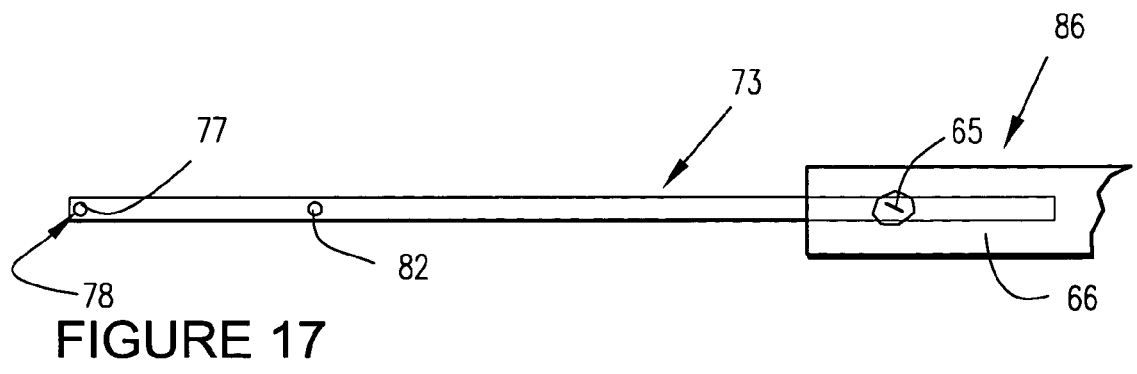
Figure 18:
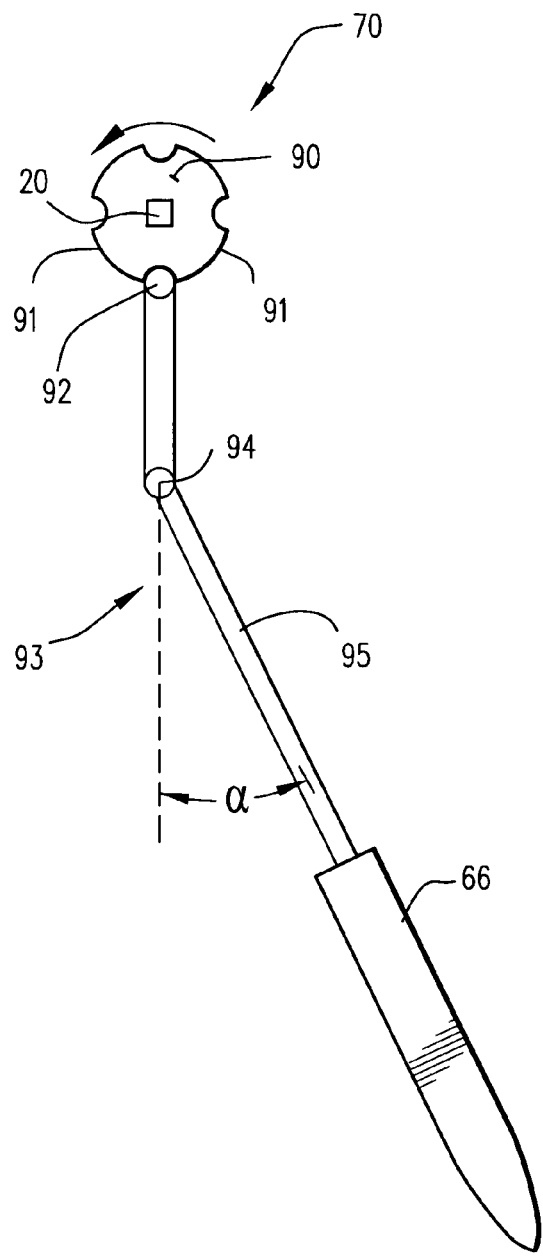
Figure 19:
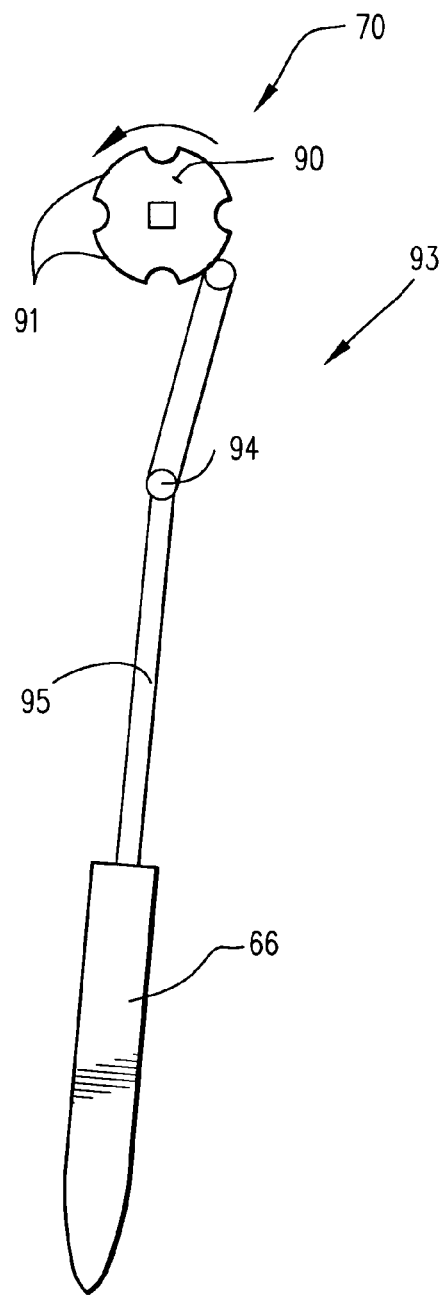

The basic feature of the system 70 is that it roughly simulates a fishtail, or sculling, action. FIG. 14 is a bottom view of the system 70, while FIGS. 15-17 are detail top views of the individual components 71-73, respectively. FIGS. 18-20 are schematic top views of other forms of the propulsion system 70, having different components, but with the same basic operating principle. Other forms are also possible for turning rotary movement into oscillation of a "flipper", such as are illustrated as movements 960 and 1032 of "1800 Mechanical Movements And Devices", ©1911, 2000, Algrove Publishing Limited.

The main components of the propulsion system 70 of FIGS. 13-17 are a drive element 71 connected to the shaft 20 for rotation therewith, a guide element 72, and an oscillating "flipper" 73. The drive element 71 may be a crank arm, as illustrated, or a disc, or of other shape. The square or other non-round hole 74 (FIG. 15) adjacent one end of crank arm 71 (or in the center thereof if a disc) is connected to the shaft 20 for rotation therewith. The hole 75 adjacent the other end of arm 71 receives a pivot pin 76. The pin 76 in turn is received by the hole 77 (FIG. 17) in the first end 78 of the oscillating element 73, so that the elements 71, 73 freely pivot with respect to each other.

Preferably, an elongated slot 79 (FIGS. 14 & 16) is formed in the guide element 72 (but another lost motion mechanism may be provided instead). The element 72 is mounted stationary to the watercraft 10, for example by bracket 80 as illustrated n FIG. 13. The slot 79 receives a pivot pin 81, which is pivoted to the oscillating element 73 at the middle opening 82 (see FIG. 17) thereof. The pivot pin 81 defines a generally vertical axis about which the element 73 is pivoted by the crank arm 71, and the pivot axis translates along the slot 79. The slot 79 may be defined by a highly polished surface (e.g. where the guide element 72 is of aluminum or another metal), or a coating, treatment, or insert of low friction material (such as PTFE) may be provided, to allow ready translation of the pivot pin 81 in slot 79 while the element 73 freely pivots with respect to the element 72. An optional spring (illustrated only schematically in dotted line at 83 in FIG. 17) may be provided at one or both ends of the slot 79. The spring 83 may be a coil spring, compressible material, or have any other conventional construction.

The pivot pin 82 may have a cap 84 at the end thereof remote from the element 73 to prevent it from inadvertently moving out of the slot 79. The cap 84 may have a low friction bottom surface, in case it inadvertently slides along the top surface of the element 72 (if the components have the orientation illustrated in FIG. 13). Another cap 85 (like cap 84) larger than the slot 79 width is desirably below the element 73. As some of several alternatives, the guide element 72 may be mounted below the oscillating element 73 instead of above it, and the pivot pin 82 may be attached to the guide element 72, and the elongated slot 79 provided in the oscillating element 73.

The oscillating element 73, at the free end 86 thereof, remote from the first end 78, is formed to roughly simulate a fish tail fin, or a sculling oar water-immersed end. While the free end 86 may be of the same relatively rigid material (e.g. aluminum or hard plastic) as the rest of the element 73, desirably the end 86 is defined by a core 65 of rigid material (e.g. aluminum or hard plastic), with a covering 66 of relatively flexible material, such as natural or synthetic rubber, or flexible plastic. The covering 66 is shown as transparent in FIG. 13 for clarity of illustration, but it may be opaque. The end 86 covering 66 may have the durometer (e.g. between about 40-100, e.g. between 60-90 as in U.S. Pat. No. 4,017,925, incorporated by reference herein), and/or have the flexible properties, of a conventional scuba diver's flipper. The covering 66 may be formed as a sleeve which fits over the termination of the rigid portion of the element 73 end 86, and attached by adhesive, a friction fit, or other standard attachment means, thereto. The covering 66 may also have one or more supporting ribs 67 at various locations, such as dihedral ribs. The core 65 merely provides support, and does not need to have the fishtail or scull ("oar", definition 1, Random House Unabridged Dictionary, 2$^{nd}$ Edition, ©1987, 1993) simulating shape of the covering 66.

Especially when connected up to a vertical axis wind turbine 15, the oscillating element 73 preferably has a range of oscillation (see y in FIG. 14) of between about 10-45 degrees. If a motor powers the drive element, then the oscillation angle may be greater.

In the FIGS. 18-20 embodiments of the propulsion system 70, instead of a crank arm and guide element, a cam and cam follower arrangement is provided. FIGS. 18 and 19 show the two extremes of an embodiment in which a cam 90 operatively connected to shaft 20 for rotation therewith has a plurality of lobes 91, which engage a cam follower 92. The follower 92 is at a first end of an oscillating lever 93, pivoted at 94 to a stationary (with respect to the watercraft 10) support (like the plate 72, but not shown). The lever 93 portion 95 on the opposite side of pivot 94 from follower 92 is at an angle $\alpha$ with respect to the portion 96 between the pivot 94 and follower 92. The angle $\alpha$ is preferably between about 5-25 degrees, e.g. about 12 degrees, so that the extent of oscillation of element 73 is between about 10-50 degrees. The portion 95 is preferably constructed like the end 86 of the FIGS. 13-17 embodiment, that is it may be rigid, but preferably has a rigid base to which is mounted a flexible fishtail-simulating element (66).

In the FIG. 20 embodiment, the cam 98 is operatively connected to the shaft 20 for rotation therewith, and has a cam track 99 formed on the top surface thereof. A follower 100 on one end 97 of the oscillating lever 101 moves in the track 99, and causes the lever 101 to oscillate about stationary pivot point 102. The free end 103 of lever 101 has a fishtail-simulating element as previously described.

In all of the FIGS. 13-20 embodiments, it may be desirable to provide a disconnect between the propulsion mechanism and the drive (e.g. wind turbine 15). Any suitable conventional disconnect may be utilized. For example, as schematically illustrated at 104 in FIG. 13, a simple clutch mechanism in shaft 20 may be disengaged manually (e.g. by a lever, not shown, located near the rudder control for watercraft 10), or electronically or by other remote control, to detach the wind turbine 15 from the crank arm 71 (or the cams 90, 98 in the FIGS. 18-20 embodiments). While any simple conventional clutch may be used, particularly desirable are claw and geared clutches, such as shown on pages 206-7 of "How Things Work", infra.

Under some circumstances—such as if there are low-wind conditions, or at start-up—it is desirable to provide a manual assist to the wind turbine for rotating the shafts 17/20 (or in some cases one of the shafts 42, 44). Such an assist is illustrated very schematically at 105 in FIG. 13; it may be hand, foot, head, or otherwise operated. The assist 105 may comprise a mechanism such as used for pull-cords for starting internal combustion engines (such as shown in U.S. Pat. Nos. 4,103,660, 5,762,037, 5,174,166, and 5,253,540, incorporated by reference herein), or for pedaling motorized bicycles (such as shown in U.S. Pat. Nos. 4,085,814 and 5,242,028, incorporated by reference herein), an assist for a wheelchair (such as shown in U.S. Pat. No. 6,302,226, incorporated by reference herein), or a paddlewheel mechanism (such as shown in U.S. Pat. No. 5,058,522, incorporated by reference herein), or such as illustrated at movement 1000 of "1800 Mechanical Movements And Devices", ©1911, 2000, Algrove Publishing Limited. One particular embodiment is illustrated schematically in FIGS. 21 and 22.

Figure 21:
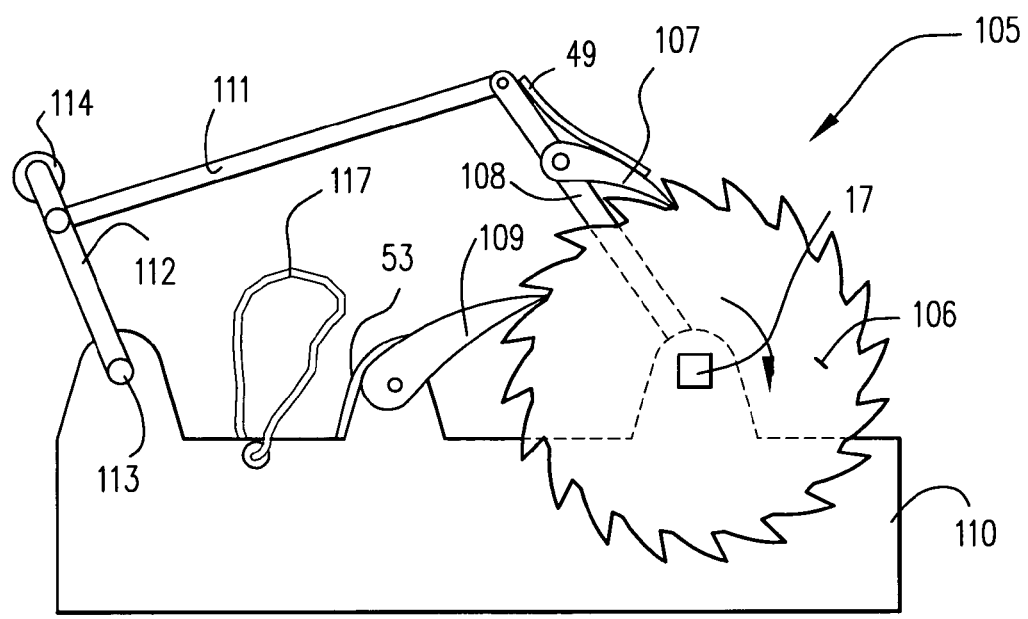
FIG. 21 is a side view of one exemplary manual assist for powering the watercraft of FIG. 1 according to the invention.

The basic assist 105 illustrated in FIG. 21 is as shown in FIG. 2 of "How Things Work", Segalat, Vol. III, page 213, Simon+Schuster; including: a ratchet wheel 106 connected to the shaft 17 for rotation therewith, a drive pawl 107 biased by a leaf spring 49 into contact with ratchet 106 and pivotally mounted to a lever 108; a catch pawl 109 biased by a leaf spring 53 into contact with the ratchet 106 and pivotally mounted to a support structure 110 on the watercraft 10 that is stationary with respect to the shaft 17; and a coupler 111 pivoted at one end thereof to the lever 108 and at the other end thereof to a crank arm 112. However, in the FIG. 21 embodiment, the crank arm 112 is rotated manually about a pivot 113 on support 110 in a generally horizontal plane, using the knob/handle 114. The adjustment slot illustrated on page 213 of "How Things Work" may or not be provided. The knob/handle 114 is preferably connected to the crank arm 112, but it may be connected to the point of connection of the coupler 111 to the crank arm 112, especially where an adjustment slot is provided.

Figure 22:
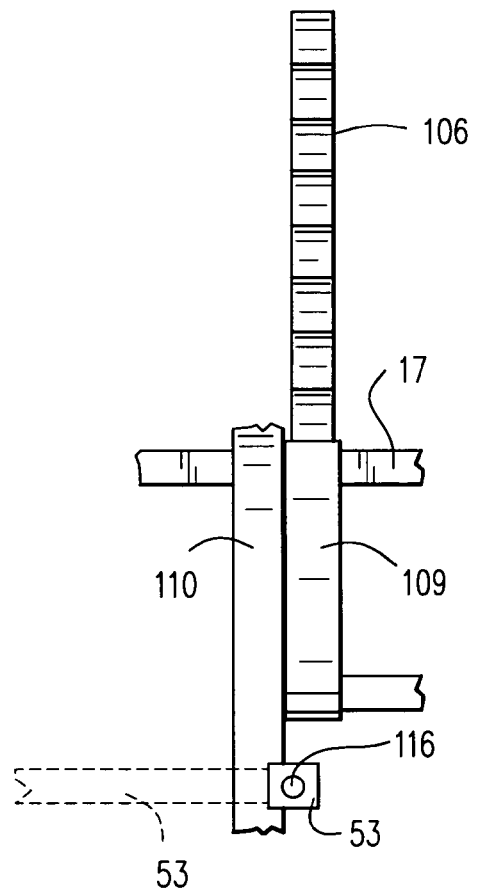
FIG. 22 is an end view of the pawl and ratchet assembly of the manual assist of FIG. 21.

When the knob 114 is rotated about a generally vertical axis, the manual assist 105 unidirectionally rotates the shaft 17 in the same direction as the wind turbine 15 does, and does not significantly interfere with the rotation of the shaft 17 when the manual assist 105 is not used. However, to insure no drag whatsoever by the pawl and ratchet arrangement of the mechanism 105, as illustrated schematically in FIG. 22 the pawls may be moved to and held in an inactive position. In FIG. 22 the spring 53 is mounted to the support 110 by a pivot pin 116 extending substantially transverse to the shaft 17. The pin 116 has a high degree of friction with respect to the spring 53 and the support 110 so that it stays in the position to which it is pivoted. However, by hand one on the watercraft 10 may simply rotate the leaf spring 53 about the axis defined by pin 116 from the active position illustrated in FIG. 21 to the deactivated position illustrated in dotted line in FIG. 22. The pawl 109 may also then be pivoted backwardly, and held in a position spaced from the ratchet 106 by any suitable latch, such as the strong elastic band loop 117 [FIG. 21] affixed to the support 110.

Alternatively, the band loop 117 may have a spring constant greater than that of the leaf spring 53, and when stretched and placed on the pawl 109 may hold the pawl in an inactive position even though the leaf spring 53 still engages the pawl 109. Alternatively, any suitable conventional mechanism may be used that performs the function of "deactivating" the pawl 109. The pawl 107 may have the same type, or a different type, of deactivating mechanism as the pawl 109. In any event, when the pawls 107, 109 are deactivated, then do not provide any drag on the shaft 17 when the manual assist 105 is not being used.

According to another aspect of the present invention, modified forms of a Savonius wind turbine, the modified forms being indicated generally by reference numeral 120 (see FIGS. 23 and 24), or 121 (see FIGS. 25 and 26) are provided. One of the wind turbines 120, 121 is preferably used as the wind turbine 15 in the watercraft 10, but is not restricted for such a use. Rather, the wind turbines 120, 121, may be used anywhere that a vertical axis wind turbine is desirable or functional. In both embodiments the modified Savonius wind turbine of the invention comprises a pair of opposite curved vanes connected together by a perforated central shaft which allows spillover from one vane to the other to increase efficiency.

Figure 23:
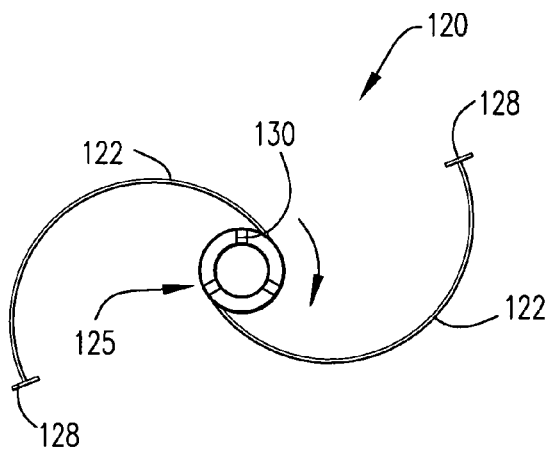
FIGS. 23 and 24 are top and partial side views, respectively, of an exemplary modified form of a large curvature-vane Savonius wind turbine.
Figure 24:
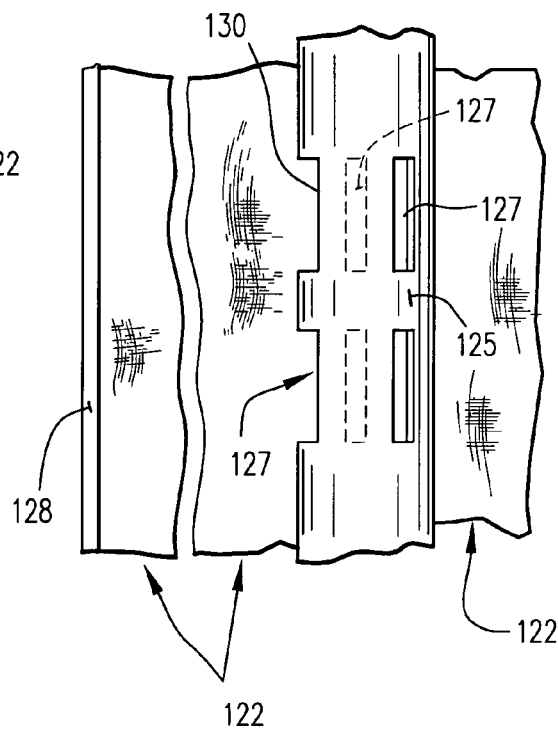

The modified Savonius wind turbine 120 of FIGS. 23 and 24 has the strength advantage of a conventional central shaft Savonius design, while at the same time having most of the enhanced-efficiency advantages of the overlapping vane designs. The conventional central shaft and overlapping vane Savonius designs are shown in "Making a simple Savonius wind turbine" by Lance Turner, viewable at www.ata.org.au.

Figure 25:
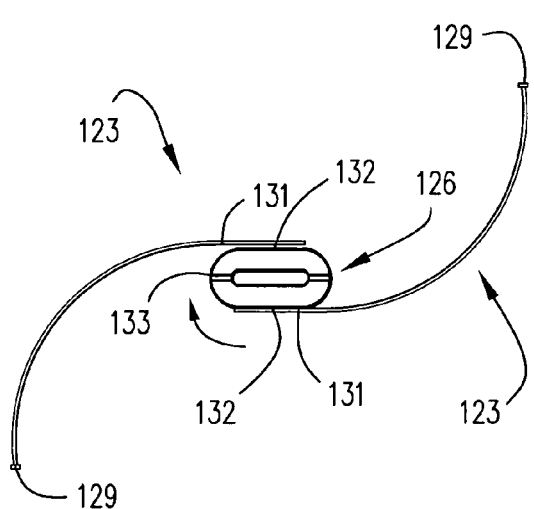
FIGS. 25 and 26 are views like that of FIGS. 23 and 24, respectively, of a modified form of overlapping vane Savonius wind turbine.

While the vanes 122, with end terminations 128, in FIG. 23 are shown shaped as in the second Turner design, they may alternatively be shaped as in the third Turner design, as seen for vanes 123 (with end terminations 129) in FIG. 25. In any event, a perforated central shaft is provided, shown by reference numeral 125 in FIGS. 23 and 24, and 126 in FIGS. 25 and 26. The shafts 125, 126 are, or are part of, the shaft 17 of the earlier figures.

The perforations 127 in the shaft 125 may be of any suitable construction, such as the substantially vertically elongated slots illustrated in FIG. 24, having a spiral or curvilinear configuration, or in the form of round or polygonal holes. Depending upon how securely the vanes 122 can be attached to the shaft 125, vane supports substantially perpendicular to the shaft 125 need not be provided, or may be minimized (e.g. only at the top and bottom of a sixteen foot high, three foot diameter, active surface wind turbine 15 for a sixteen foot Hobiecat catamaran).

The shaft 125 may be made of PVC (or other plastic, including fiber-reinforced plastic) or aluminum pipe with optional passage-defining hollow elements 130 extending between cooperating perforations 127 on opposite sides of the shaft 125. Alternatively, the shaft 125 may be solid, with the perforations 127 through-extending bores (e.g. formed by drilling or machining) therein. The vanes 122 may be sheet metal, corrugated plastic, or a like material that is lightweight and relatively corrosion-resistant, yet will withstand significant wind forces, or may be woven polyester cloth or other "sail" grade cloths. The shaft 125 and perforations 127 are constructed/provided to supply sufficient support for the vanes 122 in the wind conditions expected to be encountered, while allowing significant "spillover" from one vane to the other to increase efficiency.

Figure 26:
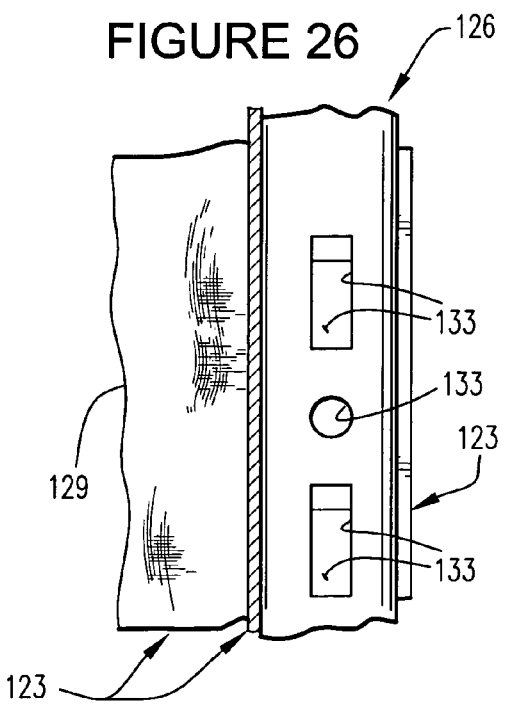

In the FIGS. 25 and 26 embodiment, the vanes 123 have substantially planar end portions 131. These may be securely affixed to the central shaft 126 by providing cooperating flat side surfaces 132 for the shaft 126. For example, the entire shaft 126 where connected to vanes 123 may have a polygonal (preferably substantially square) cross-section with perforations 133 extending substantially parallel to the surfaces 132. Alternatively, the shaft 126 may be circular in cross-section, and the portions thereof to be affixed to the end portions 131 flattened. Attachment of the portions 131 to the shaft 126 surfaces 132 may be by welding, mechanical fasteners, adhesive, or other conventional means. The perforations 133 also may have a wide variety of shapes (see the side view, partly in cross-section and partly in elevation, of FIG. 26), and the perforations 133 on opposite sides of the shaft 126 may be aligned (the round holes 133 in FIG. 26), or offset (the slots 133 in FIG. 26).

FIGS. 27-29 illustrate another—and preferred—embodiment of a manual assist 134 according to the present invention. The basic operational components of the FIGS. 27-29 embodiment are basically the same as illustrated and described in U.S. Pat. No. 5,072,929, the disclosure of which is hereby incorporated by reference herein. The components are primarily mounted on one of the hulls 11, 12, e.g. the hull 11 as seen in FIGS. 27 and 28.

Mounted on the top of hull 11, near the stern thereof, are one or more rails 135 (only one will be described) on which a seat 136 can slide back and forth. When the manual assist 134 is not used, the seat 136 is moved to a position in which the opening 137 in the rail 135, and the opening 138 in a flange 139 extending downwardly from the seat 136 are aligned, and a lock pin 140 is inserted through the openings 137, 138. When the lock pin 140 is in the openings 137, 138, the seat 136 cannot slide on the rail 135, but the operator 141 can still use the seat 137 for comfort when moving along under only wind power.

The manual assist 134 as illustrated has two drive assemblies 142, 143 so as to allow the operator 141 use of both primarily arms [drive assembly 142] and primarily legs [drive assembly 143] to power the craft 10. However, only one assembly need be provided.

The first drive assembly 142 comprises a support arm 144 mounted to the rail 135, or otherwise on or near the top of the hull 11, which mounts a pulley 145 or other low friction element that allows the ready reciprocation of a first cord 146. At a first end thereof, the first cord 146 is connected to a handle 147 which the operator 141 grabs. At a second end thereof (as seen schematically in FIGS. 28 & 29) the first cord 146 is connected to a first cord drum 148, mounted on the vertical shaft 17, 20 of the wind turbine 15. The first cord 146 is made of substantially inextensible material, such as (without limitation) a steel cable covered with a plastic sheath.

The first cord drum 148 is mounted to the shaft 17, 20 by a one-way, freewheel, clutch, shown schematically at 152 in FIG. 29. The clutch 152 may be any suitable, conventional, one-way clutch, such as shown in U.S. Pat. Nos. 3,844,391 or 4,746,112, or used in the THYS 222 Rowingbike commercially available from BCBikes.com. During a power stroke by the operator 141 (i.e. pulling the handle toward him/her with his/her arms) the clutch 152 allows the cord 146 to power the shaft 17,20 in the same direction of rotation as the wind turbine 15. When the drum 148 returns after tension on the cord 146 is released by the operator 141, the clutch 152 allows drum 148 to freewheel and take up the cord 146. The first cord drum 148 is biased—e.g. by the torsion spring 149 shown schematically in FIGS. 28 & 29, or an elastic band, or other suitable conventional biasing device (such as the recoil mechanism shown in U.S. Pat. No. 4,746,112)—so as to take up the cord 146 on the drum 148 after release by the operator 141.

The assembly 142 further comprises a pulley 150 (FIGS. 27 & 28), or like low friction, direction-changing device, mounted for rotation on or with a shaft 151. The shaft 151 preferably is provided on the fore crossbar 13, over the hull 11. The pulley 150 redirects the force on the handle 147 during the power stroke to rotation of the shaft 17, 20 as the cord 146 is taken off the drum 148, and redirects the take-up force provided by spring 149 to move the handle 147 toward the support arm 144 as the cord 146 is being taken up on the drum 148 during the release stroke.

The second drive assembly 143 is powered primarily by the operator 141's legs, not arms. The assembly 143 includes a second cord 154 of substantially inextensible material mounted at one free end thereof to the reciprocal seat 136. While in FIG. 27 the cord 154 is shown mounted to the bottom of the flange 139 extending downwardly from the seat 136, that is not necessary. The cord 154 may be mounted to any part of (or extension of) the seat 136 as long as it does not significantly interfere with reciprocation of the seat 136 along the rail 135, the hull 11, and the operator 141. For example, the cord 154 may be mounted to the front face 155 of seat 136 (see FIG. 28), in which case the flange 139 need extend downwardly from the seat 136 only far enough to provide the opening 138, and does not overhang the inner starboard face of the hull 11 (as it does in FIG. 27).

The second cord 154 may pass around two pulleys—one not shown, and the other shown at 156 in FIG. 27—mounted on the support arm 144. From the pulley 156 the cord 154 extends to the pulley 157 mounted on shaft 151 below pulley 150, to a second cord take-up on the shaft 17, 20. As seen in FIG. 29, a second cord drum 158 biased by spring 159 and mounted to shaft 17, 20 by a second one-way clutch 162, are provided. The drum 158, take-up (e.g. spring) 159, and clutch 162 may be substantially identical to (in structure and operation) the corresponding devices 148, 149, 152 associated with the first cord 146.

During a power stroke associated with the second drive assembly 143, the operator 141 places his/her feet on the support plates (only one of which is shown in FIG. 27) 163 operatively mounted to hull 11 (e.g. connected to support arm 144), and pushes with his/her legs. This moves the seat 136 aft along the rail 135, unwinding the second cord 154 from the drum 158 and rotating the shaft 17, 20 in the same direction that the wind turbine 15 rotates it. Once the end of the power stroke is reached, the operator 141 moves his/her body fore (e.g. with the assistance of the straps 164 holding his/her feet to the foot plates 163) and the seat 136 moves fore, with the spring 159 taking up the cord 154 on the drum 158 while the clutch 162 allows the drum 158 to freewheel on the shaft 17, 20. When manual assist 134 is no longer necessary (e.g. when the wind picks up so that turbine 15 alone adequately powers the craft 10), the operator 141 slides the seat 136 to an aft position in which the openings 137, 138 are aligned, and inserts the lock pin 140 through them to hold the seat 136 stationary. In this position, the handle 147 will be biased against the support arm 144 by the spring 149. The spring 159 will be taught, however, unless (e.g. using a quick release fastener, such as a Caribiner or clasp on cord 154 and a hook on seat face 155) the cord 154 is detached from the seat 136, in which case the cord 154 also will be moved to stop against arm 144.

The rail 135, support arm 144, and foot plates 163 may be mounted by any conventional mechanism(s), and in any desired orientation, on the hull 11. For example, screw fasteners, adhesive, brackets, and/or quick-release fasteners may be utilized. The rail 135, seat 136, and foot plates 163 may be permanently or removably mounted, regardless of whether the craft 10 is to be used only with a wind turbine 15, or alternatively with a conventional mast. If the craft 10 is to be alternatively used with a mast, preferably the support arm 144, shaft 151 and associated pulleys 150, 157, and the cords 146, 154 and handle 147, are mounted for ready removal.

While the exemplary manual assists described herein have been shown operatively connected to the wind turbine shaft 17, 20, a manual assist may be provided connected directly to the propeller shaft 44 when a horizontal propeller 45 is used as the propulsion mechanism. Also, even though still referred to as a "manual assist", the manually powered mechanism may be typically used to provide more than half of the drive force for the watercraft 10, with the vertical axis wind turbine 15 then typically providing less than half. In that circumstance, the wind turbine 15 would have dimensions, and be constructed, so that it was smaller than if it typically would provide the majority of the drive force for the watercraft 10.

FIG. 30 is a schematic illustration of a propulsion mechanism for the craft 10 that is an alternative to the propellers 45, 62, or fishtail system 70. In FIG. 30 a drive gear 170 is connected to the wind turbine shaft 17, 20, and cooperates with a face gear 171 concentric with and connected to a first paddle wheel 172, and a reversing gear 173. The reversing gear 173 also cooperates with a face fear 174 concentric with and connected to a second paddle wheel 175. The paddle wheels 172, 175 are mounted by any suitable conventional means (not shown) between the hulls 11, 12 for rotation about horizontal axes (or a substantially common horizontal axis). As is conventional for paddle wheels, the wheels 172, 175 are mounted so that with normal loading of the craft 10 they are approximately half in and half out of the water.

Figure 31:
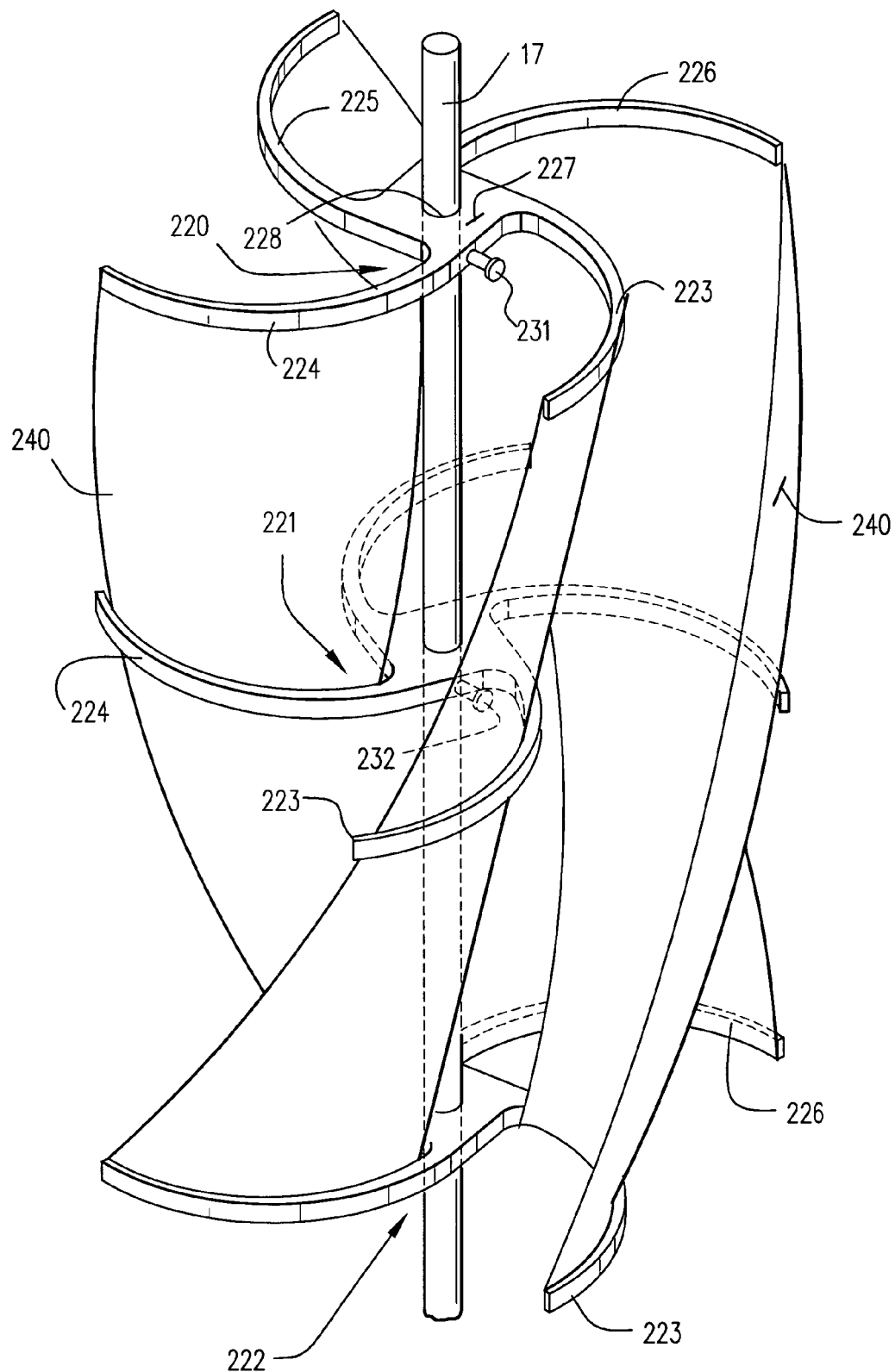
FIG. 31 is a schematic top perspective view of a open helix form of a collapsible vertical axis wind turbine according to the invention.
Figure 32:
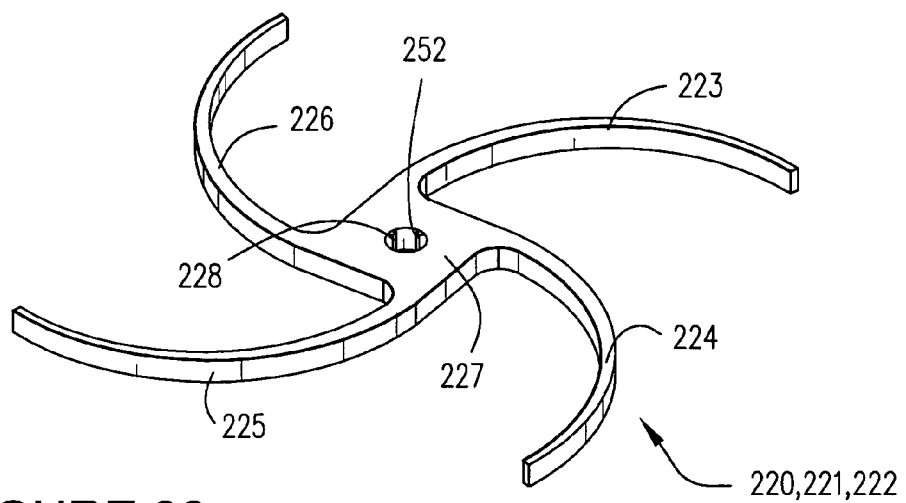
FIGS. 32-34 are perspective, top, and end views of an exemplary vane support used with the collapsible vertical axis wind turbines of FIGS. 31, 35 & 36.
Figure 33:
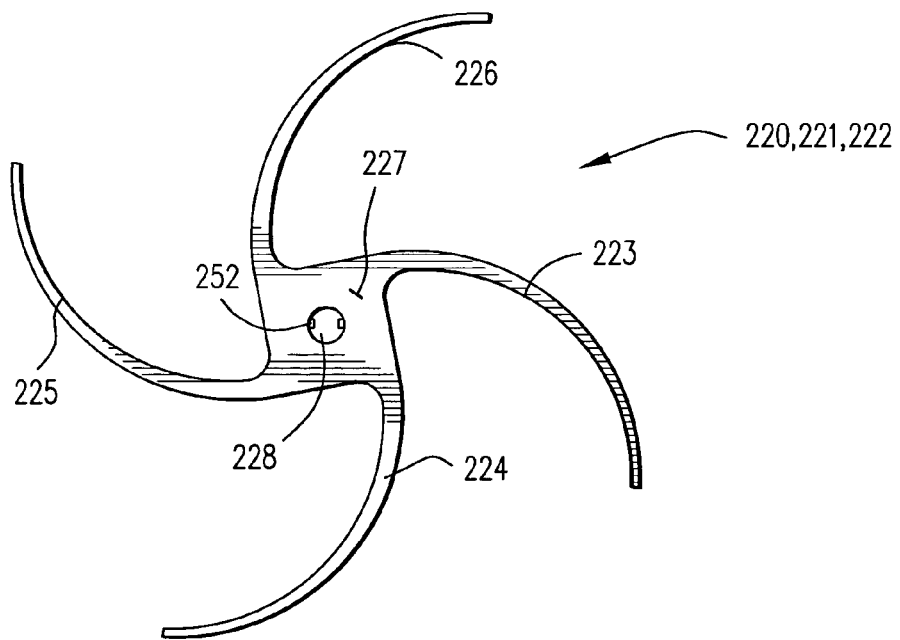
Figure 34:
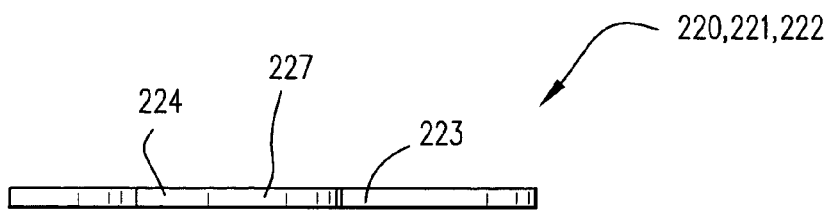
Figure 35:
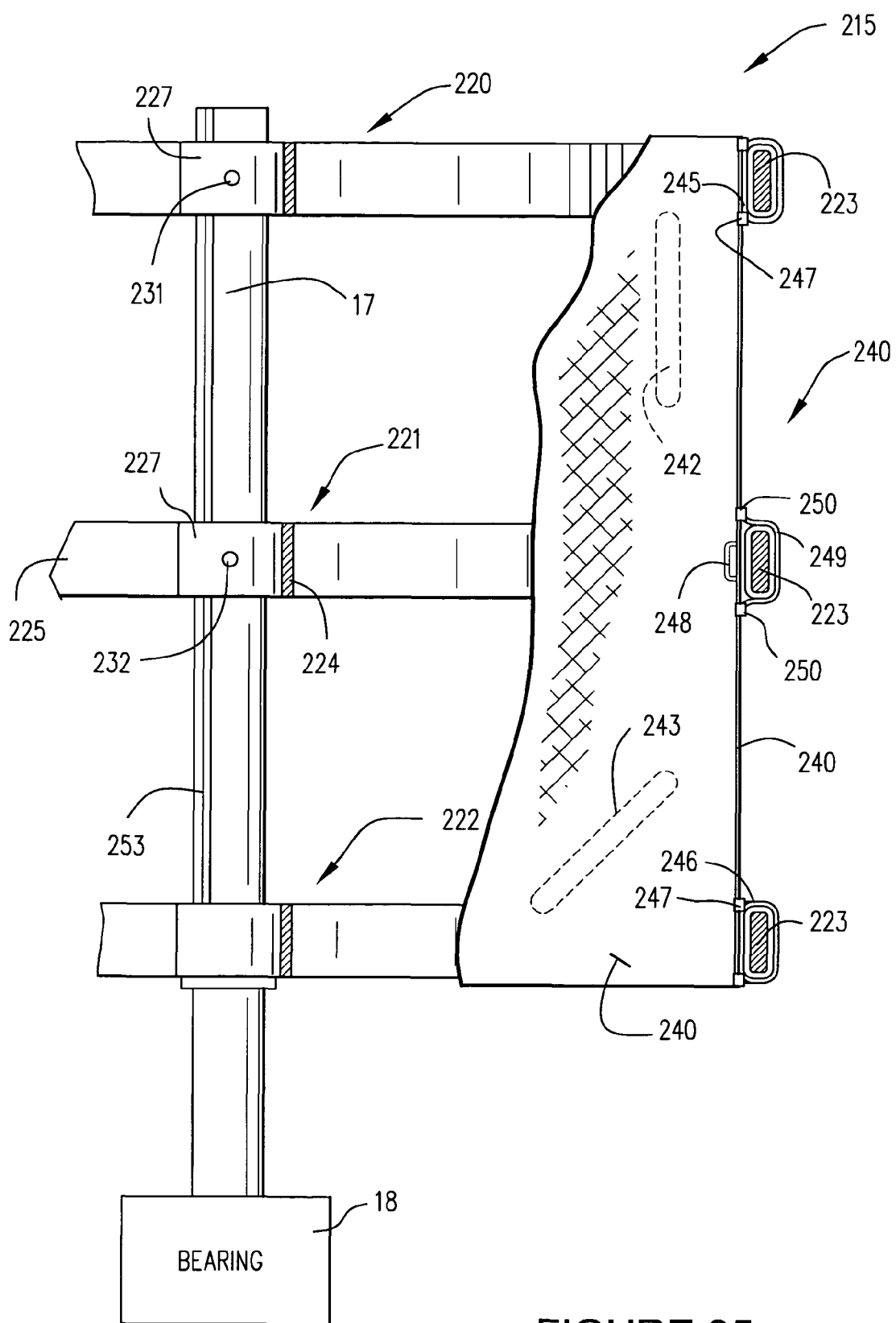
FIG. 35 is a side view, partly in cross section and partly in elevation, of the operative position of a Savonius form of collapsible vertical axis wind turbine according to the present invention, which uses the vane supports of FIGS. 32-34.
Figure 36:
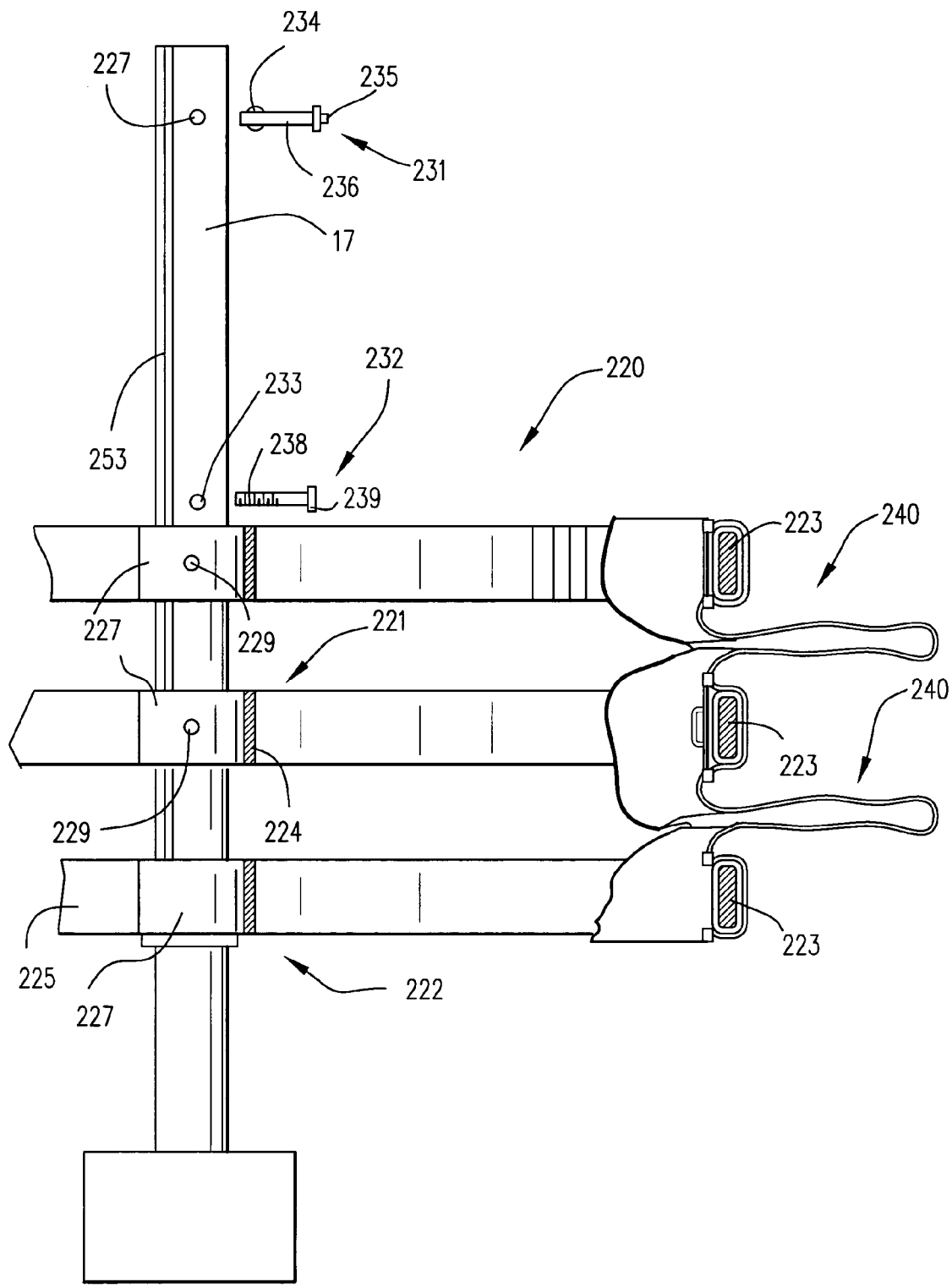
FIG. 36 is a view like that of FIG. 35 only showing the wind turbine in a collapsed position.

FIG. 31 illustrates a vertically collapsible form of wind turbine 215 that may be mounted on a multihull craft 10 as the turbine 15, according to the invention, or may be used anywhere that a wind turbine is useful. The wind turbine 215 of FIG. 31 has an open helix construction, but merely be rearranging the relative orientation of the vane supports and the design of the vanes thereof (as hereinafter described) the same basic structure can be used for a Savonius wind turbine, as seen in FIGS. 35 and 36. The vane supports and shaft 17 are common in FIGS. 31-36 and will use the same reference numerals. The configuration of the vanes is different in FIG. 31 on one hand, and FIGS. 35 & 36 on the other, and will use different reference numerals.

There are many instances in which a vertically collapsible vertical axis wind turbine 215 is desirable. Whenever it is desired to quickly deactivate the wind turbine—such as at a dock if the turbine 215 is mounted on a multihull craft 10, or when damaging high winds exist in land-based environments—a collapsible design is suitable. The vertically collapsibility of the turbine 215 is provided by the use of spaced vane supports, and flexible vanes.

In the embodiment illustrated in FIGS. 31-36, a plurality of vane supports 220, 221, and 222 are provided on a substantially vertical shaft 17. The shaft 17 may be connected to a propulsion system when used on a watercraft 10, or to a pump, generator, or other suitable mechanism when on land. While three vane supports 220-222 are illustrated in the drawings, it should be understood that two, four, or more, may be provided on a given shaft 17.

In the embodiment of the vane supports illustrated, each vane support 220-222 is illustrated as having four spokes 223, 224, 225, and 226, a central hub 227 having a concentric substantially vertical (during use) central bore 228, and for at least the vane supports 220, 221 a substantially horizontal (during use) bore 229 extending from the exterior of the hub 227 to the central bore 228. However, two, three, or more than four spokes 223, etc., may be used depending upon the particular circumstances. Also, more than one horizontal bore 229 may be used. The vane supports 220-222 may be made of any suitable material, one that preferably has high rigidity so that there is little deformation of the spokes 223, etc. during use. Hard plastic (such as Lexan), or lightweight corrosion-resistant metal (such as titanium or aluminum), or carbon fiber reinforced plastic, are examples of suitable materials.

While the spokes 223-226 are illustrated in the drawings having shapes approximating an overlapping vane Savonius design (see "Making a simple Savonius wind turbine" by Lance Turner, viewable at www.ata.org.au), the spokes 223 etc. could have more conventional and/or pronounced curvatures, especially if only two or three spokes are provided on each vane support 220-222.

The turbine 215 is made collapsible by using flexible vanes supported by the spokes 223-226, and by mounting at least the top or bottom vane support 220-221 so that it may be readily moved from an operative position (FIGS. 31 & 35) to a collapsed position (FIG. 36). For example, as seen in FIGS. 31, 35 & 36, the top and middle vane supports 220, 221, are cooperable with locking pins 231, 232 (see FIG. 36), which in turn cooperate with aligned substantially horizontal holes 233 formed in the shaft 17 to hold the vane supports 220, 221 in the operable position (FIGS. 31 & 35).

The pin 231 is shown as a conventional quick release pin which has projections 234 extending outwardly from pin shaft 236 which engage the interior wall of shaft 17 (If the shaft 17 is hollow), or interior cavities of the shaft 17, when the actuator rod 235 is extended, but which move inwardly to a non-engaging position when the rod 235 is depressed. The pin 232 is exteriorly screw-threaded, as indicated at 238, so that it cooperates with corresponding interior threads (not shown) in an opening 233. The head 239 of the pin 232 may have a screwdriver-receiving slot, a polygon shape for grasping by a wrench, wings for turning by hand, or another conventional construction. Normally only one type of pin (231 or 232) will be used with a particular shaft 17.

The turbine 215 has as many vanes 240 as spokes 223-226 on one vane support 220-222. A vane 240 is mounted by a spoke 223-226 of each of the vane supports 220-222. For example, the spokes 223 of all of the vane supports 220-222 mount one vane 240, the spokes 224 another vane 240, etc. Each vane 240 is flexible. That is, the vane 240 is of sheet (or like) material that will bend, fold, or otherwise move, to a configuration such as illustrated in FIG. 36. However, the material of which the vane 240 is made is not itself extensible. That is, the material of the vanes 240 is preferably substantially inextensible, such as the material that commercial kites, or high performance sails [e.g. woven polyester, such as Dacron®], are made of, so that the material maintains its shape when impacted by even high velocity wind when in the operable position (FIGS. 31 & 35). Certain types of metal, or metal laminated to cloth and/or plastic, also may be suitable. Also, vertical, horizontal, and/or diagonal stiffening battens (e.g. of hard plastic or metal) may be mounted with the vane 240 material (e.g. in pre-formed pockets) between the vane supports 220, 21 and 221, 222, when in the operable position (and removed before movement to the collapsing position of FIG. 36). Two such battens—a substantially vertical batten 242, and a substantially diagonal batten 243—are schematically illustrated in dotted line (within the vane 240 material) in FIG. 35.

Exactly how the vanes 240 are connected to the spokes 223, etc., may vary widely. In FIG. 31 an open helical wind turbine is illustrated. That is, the vane support 221 is offset from the supports 220, 222, so that the vane 240 material twists into a helix from the top to the bottom of the shaft 17. In this embodiment, the vane 240 material is simply attached to the spokes 223-226 by a suitable adhesive.

In the Savonius embodiment of FIGS. 35 & 36, the vane 240 material is shown connected to the spokes 223-226 by stitching. For example, the top and bottom ends 245, 246, respectively, of the vane 240 material is wrapped around the spokes 223 (seen most clearly in FIG. 5) of the upper and lower vane supports 220, 222, respectively, and stitched tightly in place by the stitches 247. For the spoke 223 of the central vane support 221, the material of the vane 240 may be attached by one or more fasteners (e.g. staples 248), adhesive, and/or pocket material 249. The pocket material 249—which like the vane material is substantially inextensible—is moved tightly into place into contact with the spoke 223, and then securely held in place by stitches 250.

While not necessary under all circumstances, in order to insure proper alignment of the cooperating spokes of the various vane supports 220-222 [whether making the helix construction of FIG. 31 or the Savonius construction of FIGS. 35 & 36] it is desirable to provide some sort of key between the shaft 17 and hubs 227. For example, as seen most clearly in FIGS. 2 & 3, one or more vertically (during use) elongated projections (keys) 252 are provided extending interiorly from the hub 227 into the central bore 228 on at least the top 220 and center 221 vane supports. The projections are 252 keyed to the shaft 17 by inserting them into one or more substantially vertically elongated grooves 253 (seen most clearly in FIGS. 35 & 36) in the shaft 17. The number and relative positions of the projections 252 (and cooperating grooves 253) will determine whether various vane supports are offset from others. For the Savonius configuration of FIGS. 35 & 36, the projections 252 in at least the hubs 220, 221 will have substantially exactly the same orientation with respect to the spokes 223-226 so that all of the cooperating spokes are vertically aligned. For the helix configuration of FIG. 31, on the other hand, the projections 252 associated with the central vane support 221 may have a different position with respect to the spoke 223 than the projections 252 associated with the top vane support 220, to provide a "twist" in the vane 240.

The bottom vane support 222 may be substantially permanently affixed to the shaft 17 (e.g. by welding and/or an adhesive), or also may be made slidable and releasably lockable in place like the supports 220, 221.

In use of the turbine 215, when in the operable position, the vane supports 220, 221 are slid along the shaft 217 (preferably with the projections 252 keyed to the grooves 253) until the openings 229, 233 align. Then locking pins (e.g. 231 or 232) are moved into place, locking the hubs 227 of the supports 220, 221 to the shaft 17. The vanes 240 are then taught, and the shaft 17 will be rotated by wind engaging the vanes 240, the force of the wind transmitted by the vanes 240, spokes 223-226, and vane supports 220-222 to the shaft 17. When one returns to the dock, or otherwise does not want the wind turbine 215 to operate, one simply releases the pins 231 or 232 (by hand, or using any suitable tool designed for that purpose). In the illustrated embodiment, this causes the vane supports 220-222 to move toward each other under the force of gravity, from the position of FIG. 35 to that of FIG. 36. That is, the wind turbine 215 collapses so that it no longer effectively functions as a wind turbine.

Instead of being moved manually, a modified form of the pin 231 may be provided that are automatically operated. For example, an electrically powered pin moving mechanism (not shown), such as a solenoid, may be mounted to at least the hub 227 of the top vane support 220 adjacent the hole 229. When a remote control actuator is operated, the powered pin moving mechanism may then move the pin 231 actuator 235, and then the pin 231 itself, to release the pin 231, thereby causing the top vane support 220 to collapse.

While particular mechanisms have been illustrated and described for connection of the vane supports 220-222 to the shaft 17, and the vanes 240 to the vane supports 220-222, it is to be understood that a wide variety of other conventional mechanisms are also possible for such attachments. Any conventional or hereafter developed structures which accomplish the same function are suitable.

FIG. 37 schematically illustrates another form of collapsible vertical axis wind turbine according to the present invention. The major difference between the wind turbine 215' of FIG. 37 and the wind turbine 215 of FIG. 31 is that only two vane supports 220', 222' are provided, each with only three spokes 223'-225', and the spokes of the various supports are of different lengths. That is, the lengths of the spokes 223'-225' of the bottom vane support 222' are less than half the length of the spokes 223'-225' of the top support 220'. While this results in less surface area of the turbine 215', the operator of a watercraft on which the device 215' is mounted would have clearer sight lines at the bottom of the turbine 215'. Further, other vane supports (e.g. two to six more) and vanes may be mounted above the vane support 220' in FIG. 37, and the portions of the turbine above the support 220' may have a Savonius configuration rather than the helical configuration for the vanes 240' illustrated in FIG. 37. Also, the upper vane support can be smaller than the next lowest one so that the upper vanes (where the wind is strongest) have less vane area, so there is less tendency to "tip" if on a craft 10.

Figure 38:
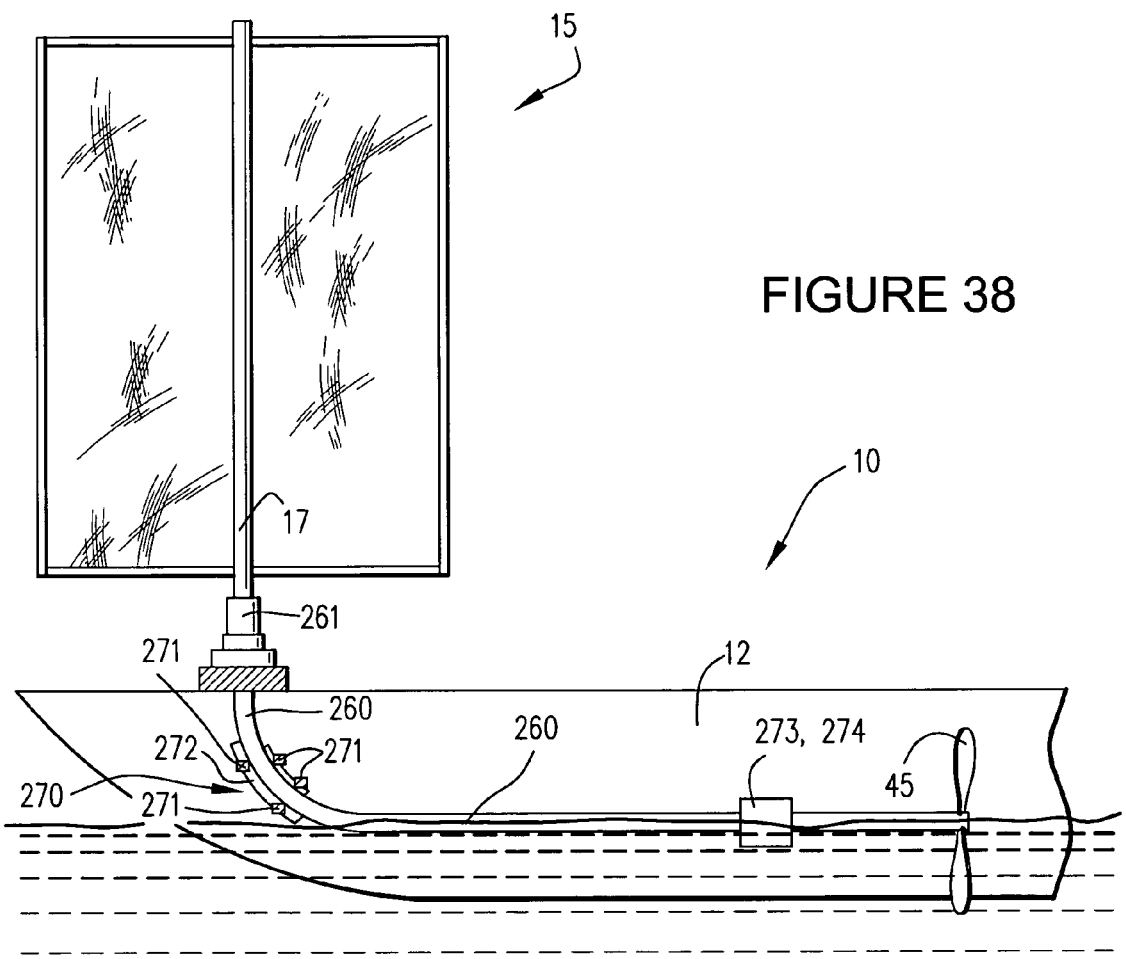
FIG. 38 is a side schematic view, partly in cross section, of a watercraft according to the invention showing a flexible drive shaft according to the invention.
Figure 39:
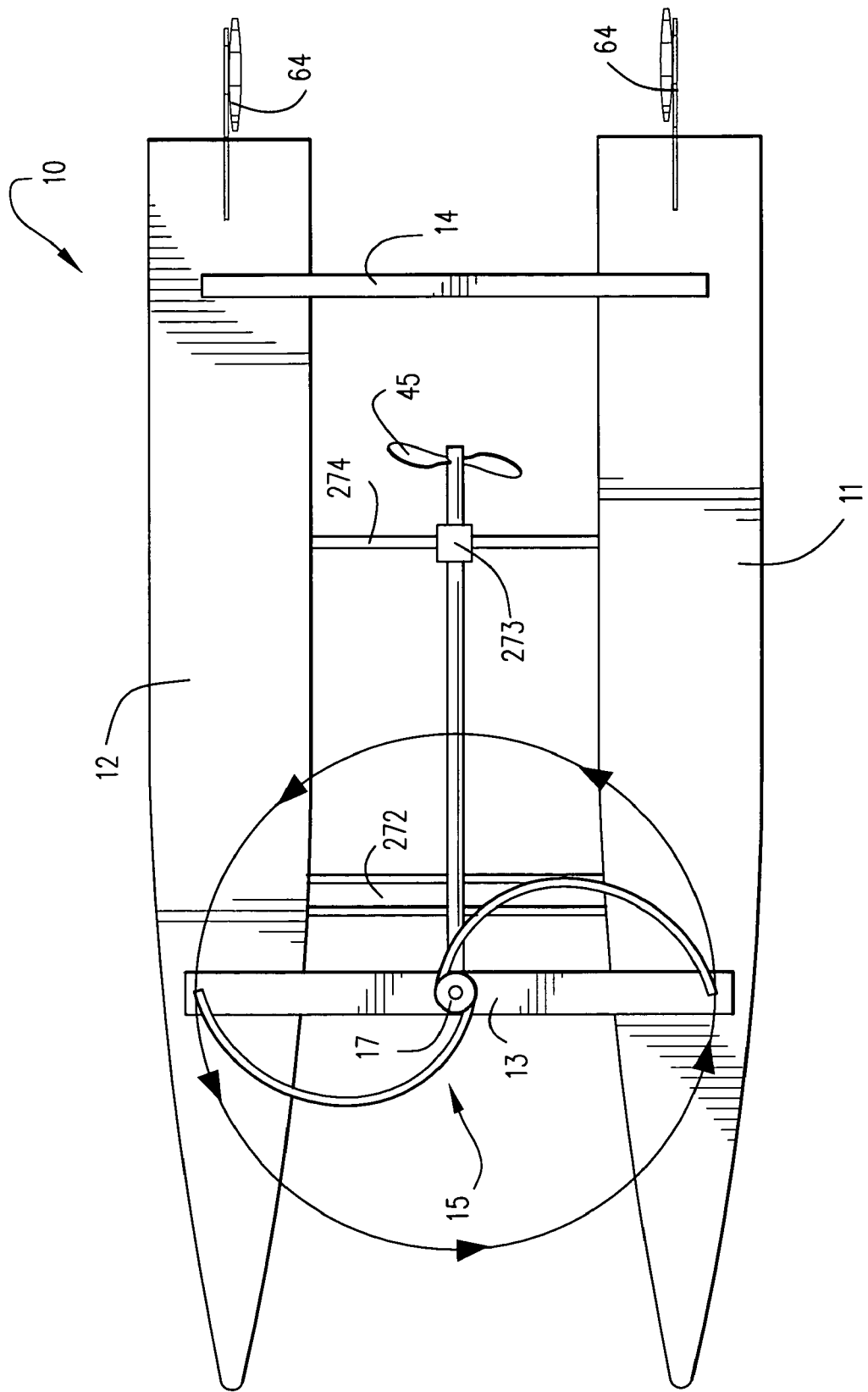
FIG. 39 is a top plan view of the watercraft of FIG. 38.

While the turbines 215, 215' may be used on land, they are particularly desirable when used on a watercraft, such as the catamaran 10 shown in FIGS. 38 & 39, having hulls 11 and 12, and crossbars 13, 14. The wind turbine 15 illustrated in FIGS. 8 & 9 is a conventional two component Savonius wind turbine, but the wind turbines 215, 215' (or other suitable wind turbines) may be substituted.

The most significant novel feature of the FIGS. 38 & 39 embodiment is the use of a flexible drive shaft. Instead of using gears, or other transfer mechanisms, for transmitting the substantially vertical axis rotation of the wind turbine shaft 17 to the horizontal propeller 45, a flexible shaft 260 is provided which—as seen in FIG. 38 is able to bend substantially 75-90 degrees in connecting the turbine shaft 17 to the propeller 45. By using the flexible shaft 260, the losses associated with gearing are eliminated.

The flexible shaft 260 may be constructed as illustrated and described in U.S. Pat. Nos. 4,832,571 or 5,820,464 (which are incorporated by reference herein). The shaft 260 may be integral with the shaft 17—that is, the shafts 17, 260 may be one piece. In such a circumstance, a clutch is not provided, however. Where a clutch is desirable, the shaft 17 may be distinct from the shaft 260, and a clutch 261 (see FIG. 38) provided therebetween.

The clutch 261 may be of any suitable conventional construction. One example, as illustrated in FIG. 40, is to provide a tube 262 keyed to the shaft 17 and having an interior with serrations 263. The serrations 263 cooperate with like grooves 264 on the upper (substantially vertical) portion of the flexible shaft 260. By pivoting or sliding the actuator 265—which cooperates with collar 266 on tube 262—upwardly, the tube moves out of contact with the flexible shaft 260, so that rotation of the shaft 17 is not transmitted to rotation of the propeller 45. When the actuator 265 is slowly moved back downwardly, the serrations 263 and grooves 264 re-engage, so that the shaft 17 again drives the propeller 45.

Instead of a clutch 261, or in addition to it, a brake may be provided. The brake may be of any conventional construction capable of significantly slowing (or stopping) the rotation of the shaft 260.

If desirable, where the flexible shaft 260 makes its primary bend—as shown schematically at 270 in FIG. 38—low friction bearing material blocks or elements 271 may be provided to insure smooth rotation or the shaft 260, like the bearing eleven illustrated in U.S. Pat. No. 4,832,571. The bearing elements 271 may be supported by any suitable cross pieces 272 extending between the hulls 11, 12. Another conventional bearing 273, supported by cross piece 274, may also be provided adjacent the propeller 45 to further insure proper rotation of the shaft 260 to drive the propeller 45.

It is desirable to mount the flexible shaft 260—as seen in FIG. 38—so that during normal loading of the craft 10, roughly half of the propeller 45 is in the water, and half out. This propeller positioning may also be used with conventional shafts, that is not just with the flexible shaft 260.

In order to allow the craft 10 to move through the water most smoothly, at least the portions of the hulls 11, 12 normally engaging the water should be made of, or coated with, a low friction material. For example, the hulls may be made of fiberglass with a smooth gel-coat, or most desirably made of marine-grade polyethylene (Roplene®). Roplene is naturally buoyant, has about five times the impact resistance of fiberglass, has about the same weight as fiberglass, and does not need gel-coats or paint to be maintained or have very low friction (e.g. a coefficient of friction of about 0.003004).

Figure 41:
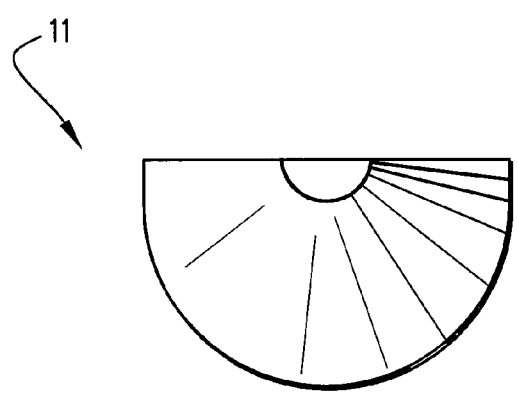
FIG. 41 is a front view of an exemplary football shaped hull of a catamaran according to the present invention.

The cross-sectional shape of the hulls 11, 12 that typically are in contact with water also affects the ease of movement of the craft 10 through the water. For example, an eighteen foot commercially available Hobiecat® catamaran may have a better shape for use with the invention than does the sixteen foot one. The optimum configuration—as illustrated schematically for the hull 11 in FIG. 41—is generally football-shaped (half a football) in cross-section. FIG. 41 is a front end view of the hull 11.

Figure 42:
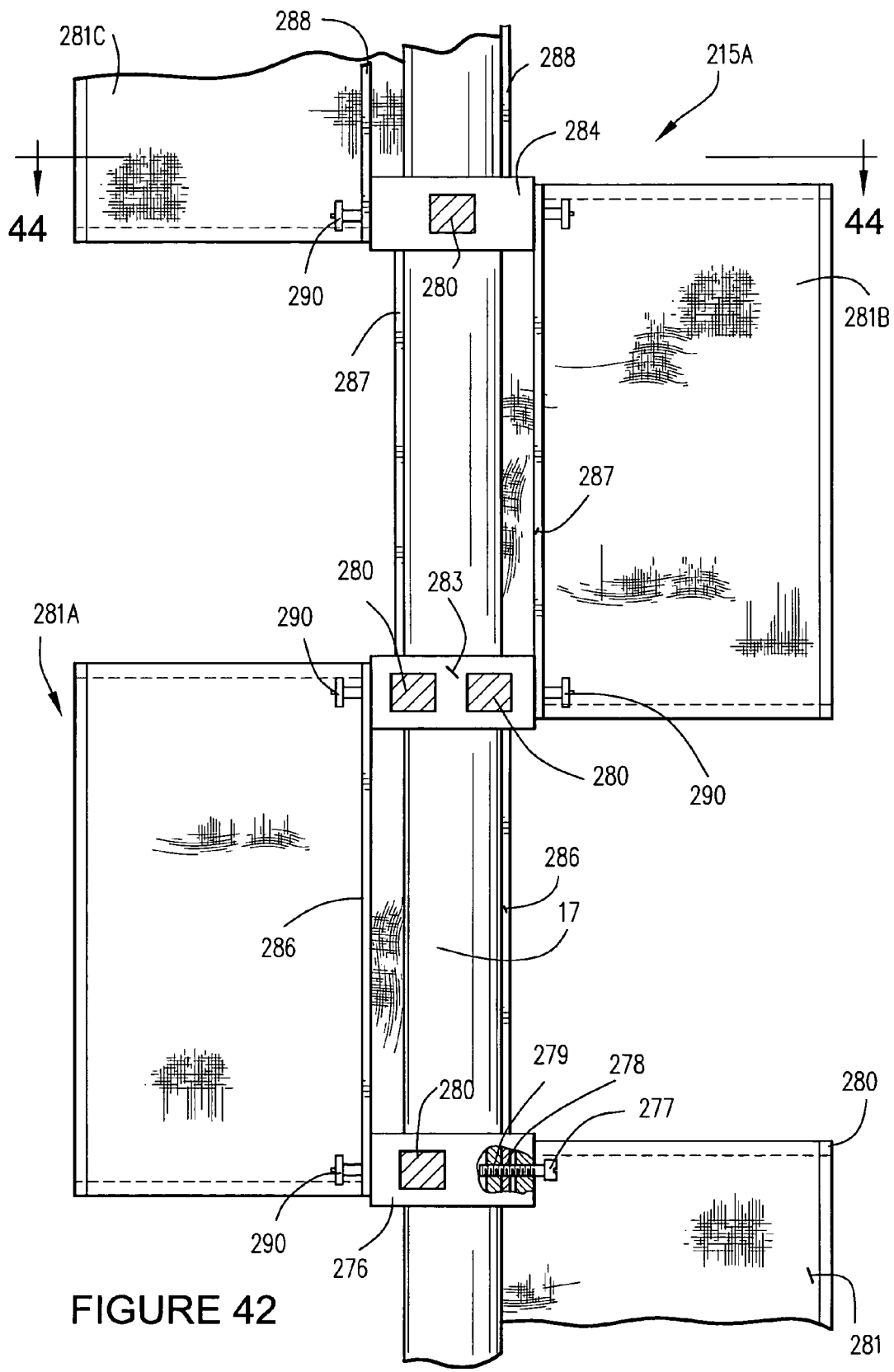
FIG. 42 is a view like that of FIG. 35 of a bottom-supported embodiment of vertically collapsible wind turbine according to the invention, with some components removed for clarity of illustration.
Figure 43:
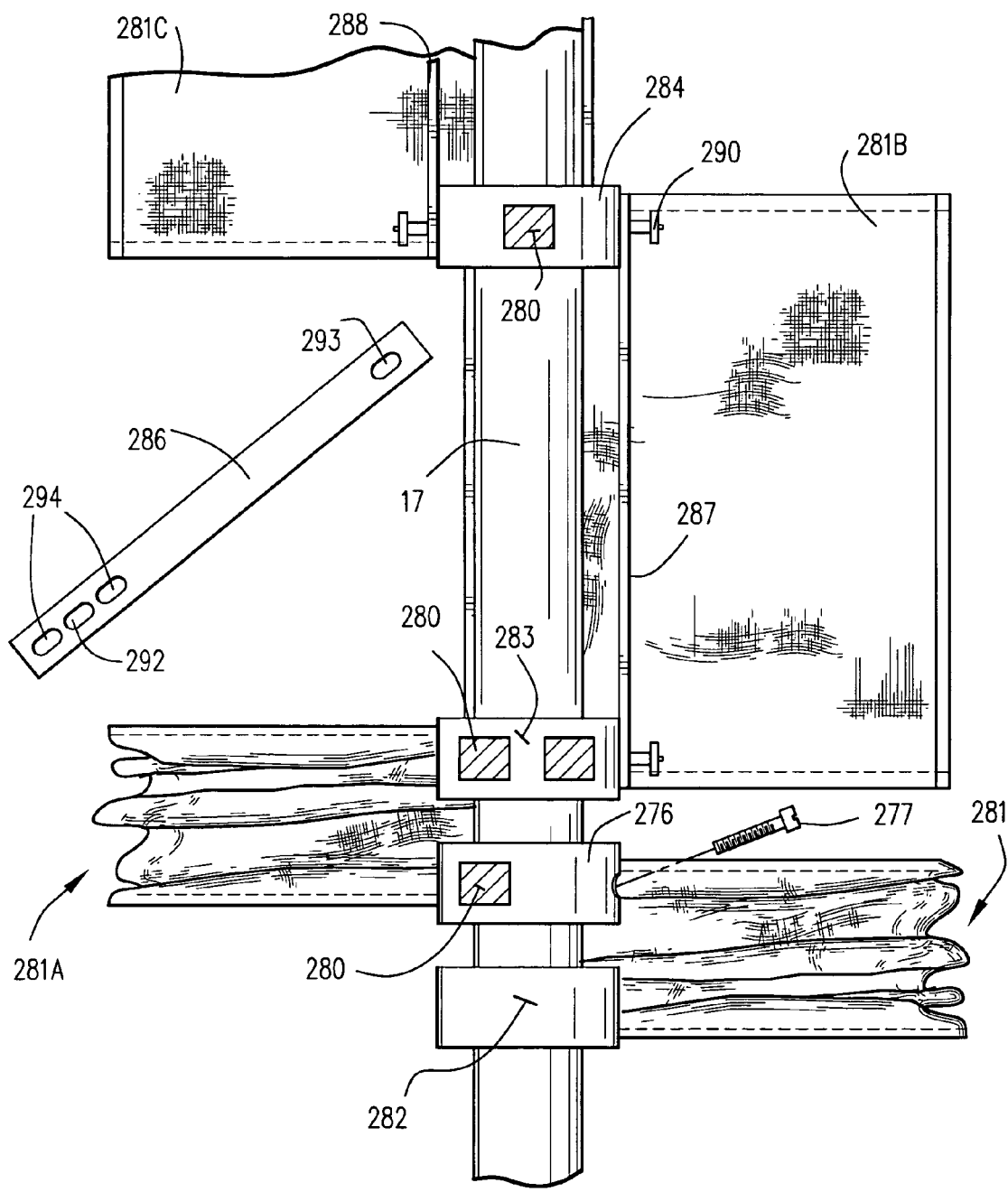
FIG. 43 is a view of the structure of FIG. 42 showing the two bottom vane assemblies in a collapsed condition.
Figure 44:
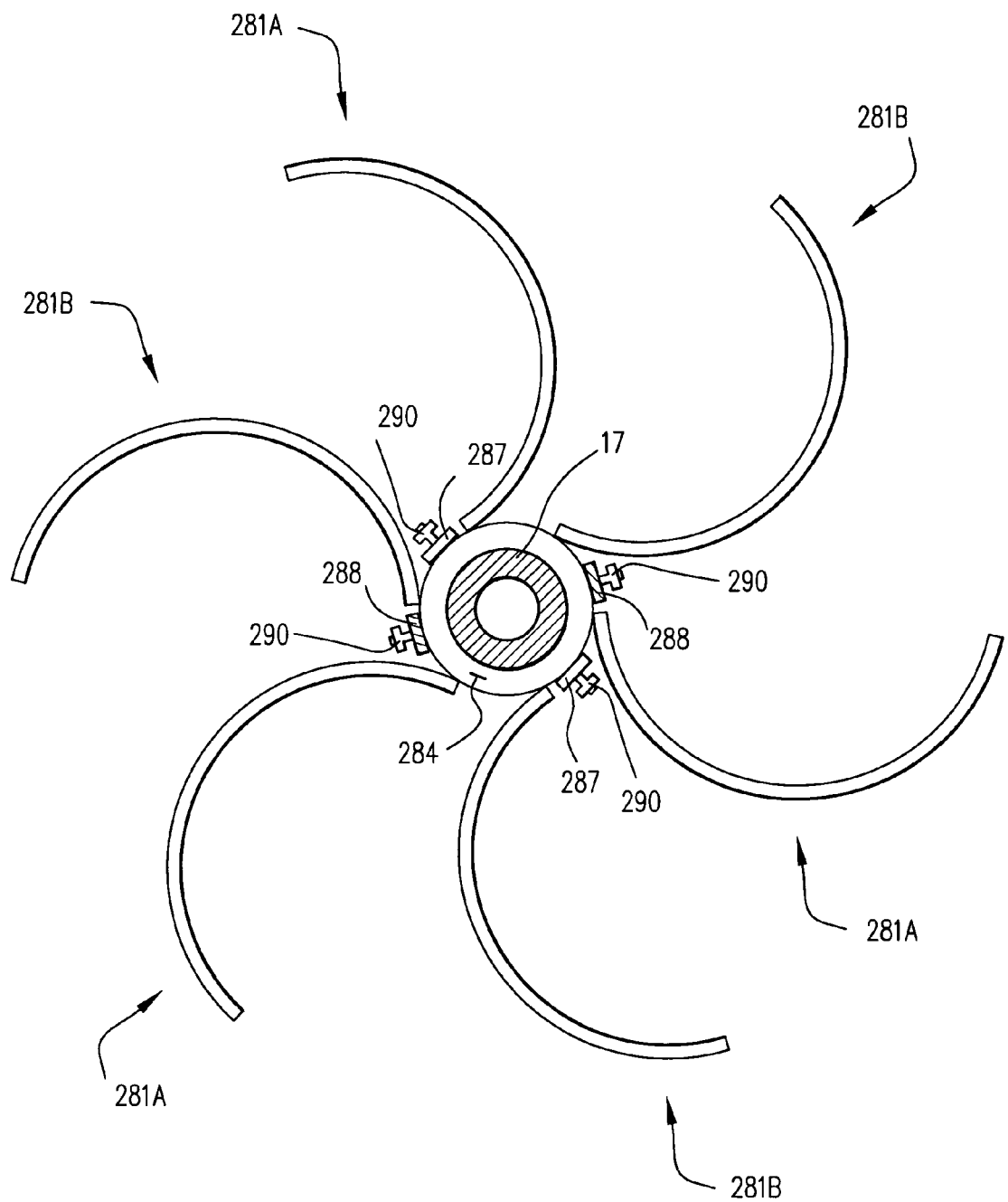
FIG. 44 is a view taken along lines 44-44 of FIG. 42, with some of the lower components removed for clarity of illustration.

FIGS. 42-44 show another embodiment of a vertically collapsible wind turbine according to the invention. This is a bottom-supported embodiment of a vertically collapsible wind turbine. The vanes, spokes, and vane supports (as hereinafter described) may have the same materials, keying, and general configurations as described above with respect to the FIG. 35 embodiment.

In FIG. 42, the only vane collapsible vane support that is affixed to the shaft 17 (the bottom vane support also may be affixed to the shaft, but is not "collapsible") when the vertical axis wind turbine 215A is deployed in operating position is the second from the bottom vane support 276. The secured vane support 276 may be secured to the shaft 17, for example, by a threaded fastener 277, passing through cooperating openings 278, 279 in the vane support 276 and shaft 17. Any other conventional type of fastener may be used, however, and more than one fastener may be employed.

The vane support 276 may have any number of spokes 280 (e.g. two-six), with vanes 281 supported thereby, of any suitable configuration (e.g. Savonius). In the embodiment shown, the support 276 actually has spokes 280 that cooperate with vanes for both the lowest vane support (shown at 282 in FIG. 43), the third from bottom vane support 283 (see the vane 281A which is supported by spokes 280 from both the vane supports 276 and 283). The vanes 281 supported by the vane support 276 and the lowest vane support 282 (see FIG. 43) are offset with the vanes 281A supported by the vane supports 276, 283.

The upper vane supports 283, 284 (and perhaps others, as many as desired) are releasably secured to the vane support 276 for movement therewith. In the embodiment illustrated, this is accomplished by using a plurality of vertical supports 286 extending between the vane supports 276, 283, a plurality of vertical supports 287 extending between the vane supports 283, 284, a plurality of vertical supports 288 extending between the vane support 284 and the one above it (not shown), etc. Each of the vertical supports 286-288 is connected to two vane supports by fasteners, such as the conventional quick release fasteners 290 (e.g. like the fasteners 231).

The various vertical supports 286-288 are preferably angularly offset from each other around the circumference of the shaft 17, just like the vanes 281, 281A, 281B, and 281C are (see FIG. 44, which best shows this offset for the vertical supports 286, 287 and the vanes 281A, 281B).

To collapse the vertical axis wind turbine 215A, the fastener(s) 277 is (are) removed, as seen in FIG. 43, which causes the vanes 281 to collapse, as the vane support 276 moves toward (and perhaps even in contact with, depending upon the volume of stiffness of the material of the vanes 281) the bottom vane support 282 (which is affixed to the shaft 17, and above the bearing 18). Then the vertical supports 286 are removed by detaching the fasteners 290 associated therewith, so that the vanes 281A collapse. This is also visible in FIG. 43, with the support 283 moving toward (and perhaps even contacting) the support 276. This process may be repeated for the vertical supports 287, 288 (and any others), in order, as desired.

To deploy the wind turbine 215A from a collapsed position (e.g. from the position of FIG. 43) the vane support 283 is moved to a position vertically spaced from the vane support 276 the same distance as the holes 292, 293 (see FIG. 43) in the vertical supports 286, which holes 292, 293 (and aligned holes—not shown—in the shaft 17) receive the fasteners 290. The fasteners 290 are then put in place (see FIG. 42). Then the vane supports 276, 282 are moved apart until the openings 278, 279 align, and then the fastener(s) 277 is (are) secured in place (see FIG. 42).

The holes 292, 293 in the vertical supports 286, 287, 288 etc. for receiving the fasteners 290 are vertically spaded the proper distance to vertically tension the vanes 281A, 281B, 281C, etc. If desired, a number of vertically spaced holes 294 may be provided to allow adjustment of the vertical tension in the vanes 281A, etc., for different wind conditions, or to accommodate stretching of the material of the vanes 281A, etc., during use over time.

Figure 45:
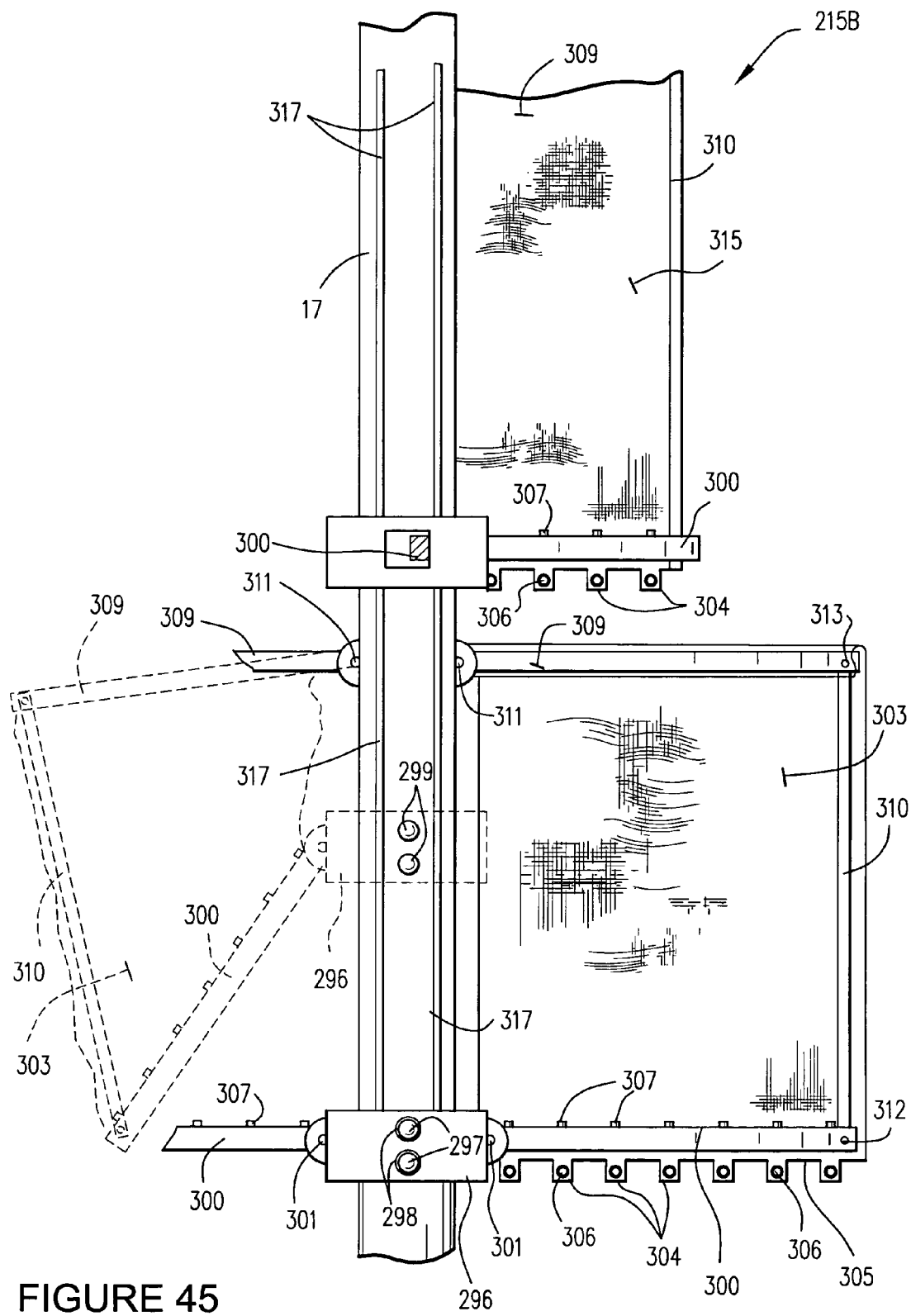
FIG. 45 is a view like that of FIG. 42 only showing a linkage embodiment of a collapsible wind turbine according to the invention (and also illustrating a readily detachable vane embodiment)
Figure 46:
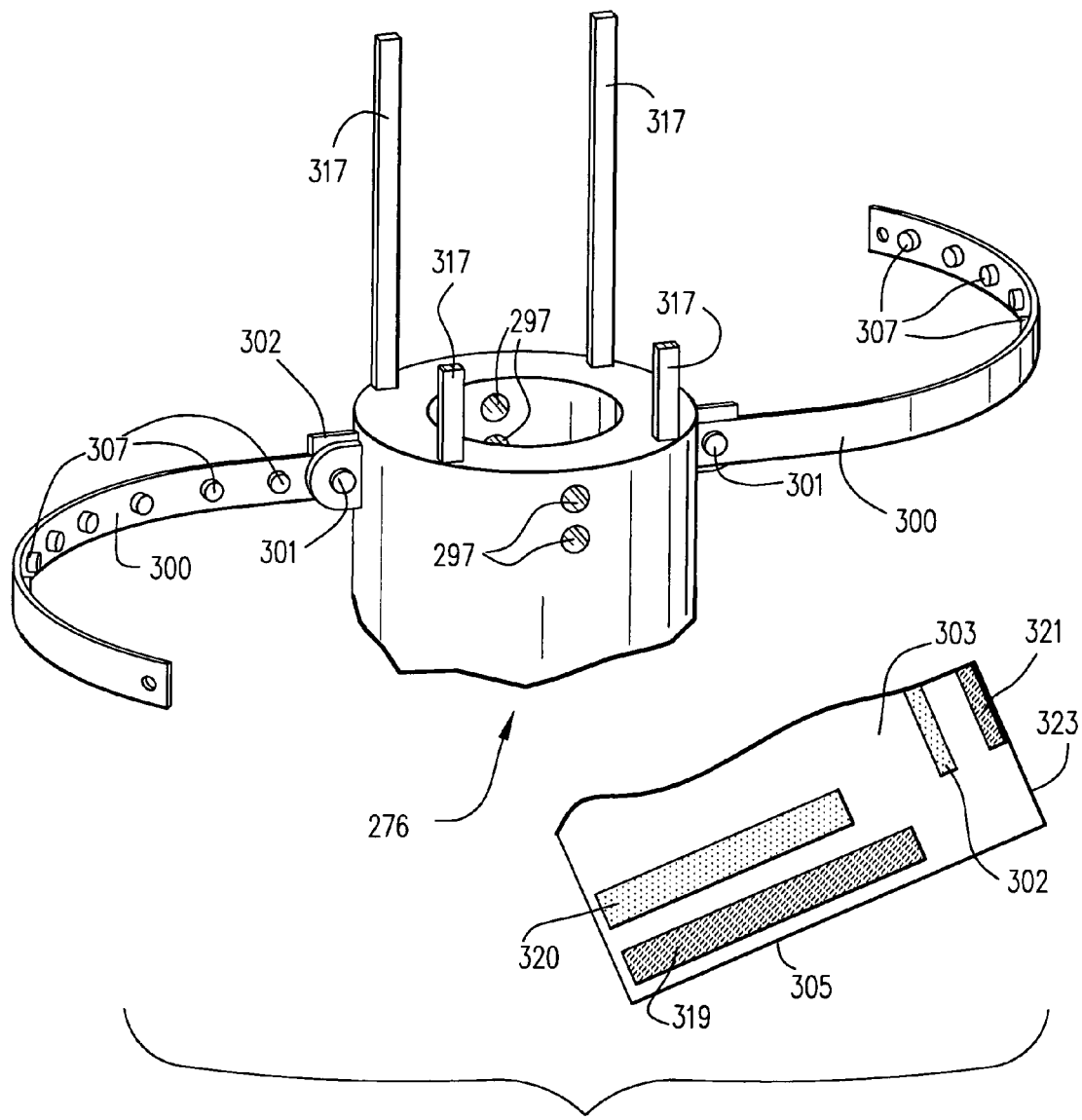
FIG. 46 is a schematic perspective view of the main vane support—and associated structures—of the linkage embodiment of FIG. 45, and a partial perspective view of the bottom of an exemplary vane of both the linkage embodiment and readily detachable vane embodiment.

FIGS. 45 & 46 schematically show a linkage embodiment of a collapsible wind turbine according to the invention. The nature of the collapse in the FIGS. 45, 46 embodiment is not properly described as vertical, or as umbrella-like, although it includes aspects of each.

FIGS. 45 & 46 show the lowest (or perhaps second lowest), main, vane support 296 having at least one, and preferably two or more sets of, openings 297 which are dimensioned and positioned to receive spring pressed pins 298 or 299 which are connected to the wind turbine shaft 17 of a vertical axis wind turbine 215B. In solid line, FIG. 45 shows the wind turbine 215B deployed in operating position, while in dotted line FIG. 45 shows the wind turbine 215B in a collapsed, inoperable, position. In the operating position, the holes 296, 297 receive the pins 298, while in the collapsed position the holes 296, 297 receive the pins 299.

The main vane support 296 has two or more curved spokes 300 (two shown in FIGS. 45 & 46) extending radially outwardly therefrom. The spokes 300 are pivoted, such as by pivot pins 301, for rotation about a substantially horizontal axis. If desired, a stop—seen schematically at 302 in FIG. 46—may be provided to prevent pivotal movement significantly above the solid line position illustrated in FIG. 45.

The curved spokes 300 cooperate with other elements (hereafter described) to support vanes 303, which are preferably like the vanes 240, 281-281C, except that each vane 303 is releasably connected to a spoke 300. While any suitable quick connect and disconnect coupling may be provided, FIG. 45 illustrates a plurality of tabs 304 at the bottom edge 305 of the vane 303 each having a male snap 306. The male snaps 306 are adapted to cooperate with female snaps 307 placed on the outer surface (preferably at or near the top surface) of the spokes 300. When the tabs 304 are looped around the spokes 303, the snaps 306 thereof may be moved into operative engagement with the snaps 307, and thereby hold the vanes 300 taut in an operable position.

The spokes 300 cooperate with upper spokes 309 and substantially vertical links 310. The upper spokes 309 preferably have substantially the same curvature as the spokes 300, and are releasably or permanently (e.g. by looping and stitching) attached to the vanes 303. The spokes 309 are pivoted—such as by pivot pins 311—to the shaft 17, above the vane support 296, for pivotal movement about a substantially horizontal axis. The links 310 are pivoted substantially at the ends thereof to the spokes 300, 309 at or near the ends thereof, such as by pivot pins 312, 313, for pivotal movement about substantially horizontal axes.

To collapse the vanes 303, one unsnaps all of the snaps 306, 307 of the vanes 303, then one simply depresses all of the pins 298 at the same time to move them out of locking engagement with the holes 297. Then the vane support 296 is manually moved upwardly to the dotted line position of FIG. 45, wherein the holes 297 are aligned with the pins 299, and the pins 299 spring into the openings 297 to lock the support 296 in the dotted line position. The top of the support 296 acts as a cam on the pins 299 to depress them until they are aligned with the holes 297, and one or both of the top of the support 296 and the pins 299 may be angled or chamfered to facilitate the camming function. The spokes 300, 309 and links 310 approximately assume the position illustrated in dotted line in FIG. 45 when the support 296 is in the dotted line position, and the vanes 303 flap loosely. Alternatively, female snaps may be provided on the spokes 309, links 310, and/or the shaft 17 for cooperation with the male snaps 306 to hold the vanes 303 in an inoperable position. Alternatively, the vanes 303 may simply be manually wrapped around the spokes 309.

There may be other sets of vanes—e.g. see the vane 315 in FIG. 45—that are collapsed at the same time as the vanes 303 are collapsed. This may be accomplished by connecting the main vane support 296 to one or more other vane supports 316 using vertical supports 317. Each of the other vane supports 316 has two or more curved spokes 300 associated therewith, which cooperate with upper spokes 309 and vertical links 310, just as with the main vane support 296. The vanes 315 may also have tabs 304, and snaps 306 for cooperating with snaps 307 just like for the vanes 303. When the main vane support 296 is moved up into the inoperable position, or down into the operable position, the vane supports 316 move with it since they are operatively connected thereto by vertical supports 317.

While the movable linkage system of FIGS. 45 & 46 is preferred for some systems, it is also possible to have all of the spokes/links 300, 309, 310 substantially rigid, and move the vanes 303, 315 into inoperative position simply by unsnapping them (detaching snaps 306, 307), and into the operative position merely by snapping them (connecting snaps 306, 307). This is referred to as the readily detachable vane embodiment. In this embodiment, the spokes 309 are preferably attached to vane supports (as in the FIG. 35 or 42 embodiments) rather than to the shaft 17, and the vertical links 310 are optional.

A wide variety of fastening mechanisms may be provided instead of the snaps 306, 307, for both the linkage and releasable vane embodiments. Virtually any readily releasable conventional fastener system (e.g. eyelets receiving rotating tabs) may be utilized. One particularly desirable system is schematically illustrated in FIG. 46 for a vane 303. Cooperating hook and loop strips 319, 320, respectively (e.g. VELCRO®) are provided on the inside surface of the vane 303 adjacent the bottom 305 thereof. The strips 319, 320 are affixed to vane 303, and spaced apart and dimensioned and positioned so that when the bottom 305 is looped over the spoke 300 the hooks and loops come into contact with each other. The strips 319, 320 are wide enough to allow some adjustment of the tautness of the vane 303, e.g. to accommodate stretching when the vane 303 is of fabric that might lose some dimensional stability over time.

If vertical links 310 are provided, it may also be desirable to use hook and loop strips 321, 322, respectively, adjacent the side edge 323 of the vane 303. The side edge 323 is looped around the vertical link 310 so that the hooks and loops of the strips 321, 322 come into cooperating engagement. Again, the strips 321, 322 may be wide enough to accommodate some loss of dimensional stability of the material of vane 303 yet provide tautness of the vane 303.

Also, It will be seen from the above description that the invention also relates to several novel methods. That is the invention also includes: (A) A method of retrofitting an existing commercial catamaran (10) having a front cross-bar (13) from a sail boat to a turbine powered boat, comprising connecting a vertical axis wind turbine shaft supporting tube (25) to the front cross-bar, inserting a shaft (17) of a vertical axis wind turbine (15) into the tube, removably mounting a propulsion system (see FIGS. 4 and 13) to the catamaran, and operatively connecting the shaft of the wind turbine to the propulsion system. This method also further comprises removing the wind turbine and propulsion system, and reconnecting a sail mast to the front crossbar. (B) A method of powering a land based powered mechanism at a dock using a watercraft having a vertical axis wind turbine (15) operatively connected to a propulsion system (e.g. see FIGS. 4 and 13), comprising: disconnecting the propulsion system from the wind turbine at a dock; connecting the wind turbine to a land based powered mechanism, such as a pump or generator; and reconnecting the propulsion system to the wind turbine to move the watercraft in water.

While exemplary embodiments of the invention have been illustrated and described, it is to be understood that they are non-limiting, and other alternatives may be used. For example (and example only), the drive components for the fishtail 86 in FIGS. 13-20 may be more complex. For example, the fishtail 86 may be mounted on a generally vertical shaft extending through a bearing supported by the watercraft 10, with a pinion on top of the shaft. The crank arm 71 is pivotally connected to a lever at one end thereof, the other end of the lever pivotally connected to a rack that is mounted by the craft 10 for sliding movement from bow to stern. The rack cooperates with the pinion to move the fishtail 86 attached to the generally vertical shaft, preferably oscillating about 10-50 degrees. Still further, the very complex oscillating mechanism illustrated in U.S. Pat. No. 4,969,846 may be utilized, or the mechanism #894 of "1800 Mechanical Movements And Devices", ©1911, 2000, Algrove Publishing Limited, may be utilized.

In the description all numerical values are approximate, and all narrow ranges within a broad range are specifically disclosed herein (e.g. a durometer of 40-100 includes 41-55, 61-91, 89-93, and all other narrow ranges within that broad range). The invention is to be accorded the broadest interpretation of the appended claims to encompass all equivalent devices and methods, and the broadest interpretation allowable considering the prior art.

What is claimed is:

1. A watercraft comprising a catamaran or trimaran and further comprising: a vertical axis wind turbine including a shaft; a propulsion mechanism operatively connected to the shaft; and a manual assist operatively connected to the shaft and wherein the manual assist comprises a leg powered mechanism.

2. A watercraft as recited in claim 1 wherein the propulsion mechanism comprises a first gear connected to the shaft for rotation therewith and linear movement therealong, a second gear operatively mounted to a propeller shaft of a substantially horizontal propeller; and a lifting mechanism which moves the first gear along the shaft between positions engaging, and disengaged from, the second gear, the lifting mechanism and first gear having cooperating surfaces of low friction material, whereby the lifting mechanism functions as a clutch, or high friction material, whereby the lifting mechanism functions as a clutch and brake.

3. A watercraft as recited in claim 2 further comprising a third gear operatively connected to the shaft for rotation therewith, and positioned with respect to the first and second gears so that the third gear can be moved into operative engagement with the second gear simultaneously with moving the first gear out of engagement with the second gear, so that the propeller can be rotated to selectively move the watercraft forward or in reverse.

4. A watercraft as recited in claim 1 wherein the manual assist comprises primarily human arm powered and human leg powered drive assemblies each comprising a substantially inextensible cord, a cord drum operatively connected by a one-way clutch to the wind turbine shaft, and a takeup device operatively connected to the cord drum; the one-way clutches providing powered rotation of the wind turbine shaft only in the same direction that the wind turbine rotates the shaft.

5. A watercraft as recited in claim 4 comprising a multihull; and wherein the manual assist further comprises a reciprocal seat mounted at an aft portion of one of the hulls, the leg powered drive assembly cord operatively mounted to the seat, and a handle mounted to the arm powered drive assembly cord.

6. A watercraft as recited in claim 5 further comprising a device which readily releasably locks the seat in place on the hull so that the seat does not move.

7. A watercraft as recited in claim 1 wherein the manual assist comprises both arm and leg powered mechanisms.

8. A watercraft as recited in claim 1 wherein the vertical axis wind turbine comprises a Savonius wind turbine.

9. A watercraft as recited in claim 8 wherein the Savonius wind turbine comprises a modified Savonius wind turbine having vanes operatively connected to a perforated central shaft allowing spillover from one vane to another.

10. A watercraft as recited in claim 1 further comprising a clutch operatively connected between the propulsion mechanism and the shaft.

11. A watercraft as recited in claim 1 further comprising a manually actuated brake for significantly slowing or stopping rotation of the shaft.

12. A watercraft as recited in claim 1 wherein the propulsion mechanism comprises an oscillating fishtail simulating mechanism.

13. A watercraft as recited in claim 12 wherein the fishtail simulating mechanism comprises a drive element connected to the wind turbine shaft, and an oscillating element with a flexible material free end operatively connected to the drive element.

14. A multihull watercraft comprising: a plurality of hulls; a propulsion mechanism mounted between two of the hulls; a vertical axis wind turbine operatively mounted to at least one hull, the wind turbine having a shaft; and an operative connection between the wind turbine shaft and the propulsion mechanism, the operative connection including: a first gear operatively connected to the shaft for rotation therewith and linear movement therealong: a second gear operatively mounted to the propulsion mechanism: and a clutch comprising a lifting mechanism which moves the first gear along the shaft between positions engaging, and disengaged from, the second gear; and further comprising a seat mounted on an aft portion of one of the hulls, a device which selectively maintains the seat in a stationary position, or allows reciprocation thereof fore and aft along the hull, a substantially inextensible cord operatively connected to the seat for movement therewith, a cord drum mounted by a oneway clutch to the wind turbine shaft, and a take-up mechanism operatively mounted to the cord drum, so that an operator powering movement of the seat fore and aft assists in powering the propulsion mechanism.

15. A multihull watercraft having a vertical axis wind turbine and connected propulsion mechanism removably mounted thereto, and a device which can mount a sailboat mast; so that the watercraft may be used as a wind turbine powered craft or a sail boat.

16. A multi hull watercraft as recited in claim 15 wherein the watercraft comprises a catamaran having a pre-existing fore crossbar, and a dolphin striker post and dolphin striker rod operatively associated with the fore crossbar; and further comprising a rotating shaft of the wind turbine removably mounted in a tube to the crossbar.

17. A method of using the multihull watercraft of claim 15 by: insuring a mast is not mounted by the device which can mount a sailboat mast; mounting the wind turbine and propulsion mechanism to the multihull craft; and using the craft as a wind turbine powered craft.

18. A multihull watercraft comprising: a plurality of hulls; a propulsion mechanism operatively mounted to at least one hull and comprising a substantially horizontal axis propeller at least twelve inches in diameter; a Savonius vertical axis wind turbine operatively mounted to at least one hull, and having a shaft; and an operative connection between said wind turbine shaft and said propeller, said operative connection including a clutch; and wherein the wind turbine and propulsion mechanism are operatively connected by a first gear connected to the shaft for rotation therewith; and wherein the propulsion mechanism comprises a substantially horizontal axis propeller, having a propeller shaft with a second gear thereon for cooperating with the first gear; and wherein the clutch comprises a lifting mechanism which moves the first gear between positions engaging or disengaging the second gear.

19. A multihull watercraft as recited in claim 18 wherein a single vertical axis wind turbine and single clutch are provided.

20. A multi hull watercraft as recited in claim 18 wherein the wind turbine is operatively mounted between two hulls, and the propulsion mechanism includes a substantially horizontal axis propeller between said two hulls to which the wind turbine is operatively mounted.

21. A multihull watercraft comprising: a plurality of hulls; a propulsion mechanism operatively mounted to at least one hull; a vertical axis wind turbine operatively mounted to at least one hull, and having a shaft; an operative connection between the wind turbine shaft and propulsion mechanism; and a connection of the wind turbine to a pump or generator at a dock so that when the watercraft is docked the pump or generator is operated by the wind turbine.

22. A multihull watercraft comprising: a plurality of hulls; a propulsion mechanism operatively mounted to at least one hull; a Savonius vertical axis wind turbine operatively mounted to at least one hull, and having a shaft and vanes; an operative connection between the wind turbine shaft and propulsion mechanism; and readily removable connectors operatively connecting the vanes to the shaft so that upon detachment of the vanes from the shaft the shaft will substantially not be rotated by wind engaging the vanes.

23. A catamaran or trimaran having at least two spaced hulls; a vertical axis wind turbine including a shaft operatively mounted to at least one of the hulls; a substantially horizontal axis propeller operatively connected to the shaft and driven by the shaft; and a human powered device for powering the catamaran or trimaran and operatively connected thereto.

24. A catamaran or trimaran as recited in claim 23 wherein the vertical axis wind turbine comprises a Savonius wind turbine.

25. A catamaran or trimaran as recited in claim 23 further comprising a second vertical axis wind turbine and a second propeller operatively connected thereto; and wherein said wind turbine and said second wind turbine are both operatively connected to at least one hull of said catamaran or trimaran.

* * * * *